US011868144B2

(12) United States Patent
Wake et al.

(10) Patent No.: US 11,868,144 B2
(45) Date of Patent: *Jan. 9, 2024

(54) DRONE SYSTEM, DRONE, PLAN MANAGEMENT APPARATUS, PLAN MANAGEMENT METHOD FOR DRONE SYSTEM, AND PLAN MANAGEMENT PROGRAM FOR DRONE SYSTEM

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 234 days.

This patent is subject to a terminal disclaimer.

(21) Appl. No.: 17/423,937

(22) PCT Filed: Jan. 21, 2020

(86) PCT No.: PCT/JP2020/001973
§ 371 (c)(1),
(2) Date: Jul. 19, 2021

(87) PCT Pub. No.: WO2020/153367
PCT Pub. Date: Jul. 30, 2020

(65) Prior Publication Data
US 2022/0091619 A1    Mar. 24, 2022

(30) Foreign Application Priority Data
Jan. 23, 2019  (JP) .................................. 2019-009699

(51) Int. Cl.
*G05D 1/10*     (2006.01)
*B60L 58/12*    (2019.01)
(Continued)

(52) U.S. Cl.
CPC .............. *G05D 1/101* (2013.01); *B60L 58/12* (2019.02); *B64C 39/024* (2013.01); *B64D 1/16* (2013.01);
(Continued)

(58) Field of Classification Search
CPC ................. G05D 1/101; G05D 1/0217; G05D 2201/0201; B60L 58/12; B60L 2200/10;
(Continued)

(56) References Cited

U.S. PATENT DOCUMENTS

2016/0039300 A1\*  2/2016  Wang ..................... B64D 27/24
                                                      244/58
2018/0196418 A1\*  7/2018  Meier .................. G05D 1/0011
2021/0155344 A1\*  5/2021  Mura Yañez .......... B64U 70/00

FOREIGN PATENT DOCUMENTS

CN       104386258 A      3/2015
CN       107667321 A  \*  2/2018  ............. B64C 13/04
(Continued)

OTHER PUBLICATIONS

Machine Translation of CN-107667321-A (Year: 2018).\*
(Continued)

*Primary Examiner* — Alan D Hutchinson
(74) *Attorney, Agent, or Firm* — MATTINGLY & MALUR, PC

(57) ABSTRACT

In a drone system in which a drone and a movable body operate in coordination with each other, the drone performing a predetermined operation in an agricultural field, the movable body being capable of moving with the drone aboard and allowing the drone to make a takeoff and a landing, the plan determining section determines a flight plan for the drone and a movement plan for the movable body in accordance with the flight plan, and the instructing section instructs the drone to execute an operation in accor- (Continued)

dance with the flight plan and instructs the movable body to move or to be on standby in accordance with the movement plan.

19 Claims, 19 Drawing Sheets

(51) Int. Cl.
| | |
|---|---|
| *B64C 39/02* | (2023.01) |
| *B64D 1/16* | (2006.01) |
| *G08G 5/00* | (2006.01) |
| *G08G 5/02* | (2006.01) |
| *A01C 7/08* | (2006.01) |
| *A01C 23/04* | (2006.01) |
| *A01M 7/00* | (2006.01) |
| *A01M 9/00* | (2006.01) |
| *B64U 10/13* | (2023.01) |
| *B64U 101/00* | (2023.01) |

(52) U.S. Cl.
CPC ........... *G08G 5/003* (2013.01); *G08G 5/0069* (2013.01); *G08G 5/02* (2013.01); *A01C 7/08* (2013.01); *A01C 23/047* (2013.01); *A01M 7/0089* (2013.01); *A01M 9/0092* (2013.01); *B60L 2200/10* (2013.01); *B64U 10/13* (2023.01); *B64U 2101/00* (2023.01); *B64U 2201/00* (2023.01)

(58) Field of Classification Search
CPC .. B60L 53/80; B60L 2240/18; B60L 2240/12; B60L 2240/16; B60L 2240/20; B60L 2240/622; B60L 2250/16; B60L 2260/32; B64C 39/024; B64C 27/08; B64C 39/02; B64D 1/16; B64D 1/18; G08G 5/003; G08G 5/0069; G08G 5/02; A01C 7/08; A01C 23/047; A01M 7/0089; A01M 9/0092; A01M 7/00; B64U 10/13; B64U 2101/00; B64U 2201/00; B64U 2101/60; B64U 30/20; B64U 50/19; B64U 80/86; B64U 2201/104; Y02T 10/7072; Y02T 10/72; Y02T 10/70; Y02T 90/16; B64F 1/00
See application file for complete search history.

(56) References Cited

FOREIGN PATENT DOCUMENTS

| | | |
|---|---|---|
| CN | 207023009 U | 2/2018 |
| JP | 2001-120151 A | 5/2001 |
| JP | 2017-68532 A | 4/2017 |
| JP | 2017-163265 A | 9/2017 |
| JP | 2018-503194 A | 2/2018 |
| JP | 2019-08409 A | 1/2019 |
| KR | 10-2017-004507 A | 1/2017 |
| WO | 2017/006421 A1 | 1/2017 |

OTHER PUBLICATIONS

International Search Report of PCT/JP2020/001973 dated Mar. 17, 2020.
Japanese Office Action received in corresponding Japanese Application No. JP2020-517218 dated Dec. 18, 2020.
Japanese Office Action received in corresponding Japanese Application No. JP2020-517218 dated Mar. 4, 2021.
Chinese Office Action received in corresponding Chinese Application No. 202080007608.0 dated Mar. 1, 2022.

* cited by examiner

US 11,868,144 B2

DRONE SYSTEM, DRONE, PLAN MANAGEMENT APPARATUS, PLAN MANAGEMENT METHOD FOR DRONE SYSTEM, AND PLAN MANAGEMENT PROGRAM FOR DRONE SYSTEM

TECHNICAL FIELD

The invention of the present application relates to a drone system, a drone, a plan management apparatus, a plan management method for the drone system, and a plan management program for the drone system.

BACKGROUND ART

Application of a small helicopter (multicopter) generally called a drone has progressed. One of important fields of the application is spreading a chemical agent, such as agrochemical and liquid fertilizer, over farmland (an agricultural field) (e.g., see Patent Literature 1). For relatively narrow farmland, using a drone rather than a piloted airplane or helicopter is often suitable.

Thanks to a technology such as a quasi-zenith satellite system and a real time kinematic-global positioning system (RTK-GPS), it is possible to grasp an absolute position of a drone in flight accurately down to several centimeters, thereby enabling autonomous flight with a minimum of manual control and efficient, accurate spreading of a chemical agent even in farmland having a narrow, complicated terrain, which is typically seen in Japan.

On the other hand, as for autonomous flying drones for spreading an agricultural chemical agent, it is difficult to say that consideration is sufficiently given to their safety. A drone equipped with a chemical agent weighs several tens of kilograms, and thus occurrence of an accident such as falling onto a person can cause a serious consequence. In addition, it is necessary to provide a foolproof scheme for drones because an operator of a drone is typically not an expert; however, consideration of such a foolproof system has been insufficient. Hitherto, although there has been a technique for safety of a drone predicated upon control by human (e.g., see Patent Literature 2), there has been no technique for dealing with a safety issue peculiar to an autonomous flying drone for spreading an agricultural chemical agent.

To cause a drone to fly over an agricultural field, a movable body that transports the drone to a predetermined location in a vicinity of the agricultural field and equipment that allows the drone to make a takeoff and a landing are needed; if the movable body transports the drone and serves as the takeoff-landing equipment, it is convenient. By making a movable body serve also as takeoff-landing equipment for a drone, it is possible to set a takeoff-landing point at any point, and as a result, a flexibility of setting an operation plan is increased, and an efficient, safety-sensitive operation plan can be created.

However, none of Patent Literatures describes a system including a drone that executes a predetermined operation by automatic flight and a movable body that transports the drone. That is, there has been no disclosure about a system that creates, for a system including a drone that executes a predetermined operation by automatic flight and a movable body that transports the drone and serves as a takeoff-landing point, an operation plan for the drone and the movable body automatically.

CITATION LIST

Patent Literature

[Patent Literature 1]
   Japanese Patent Laid-Open No. 2001-120151
[Patent Literature 2]
   Japanese Patent Laid-Open No. 2017-163265

SUMMARY OF INVENTION

Technical Problem

An object of the present invention is to determine, in a system including a drone that executes a predetermined operation by automatic flight and a movable body that transports the drone, an operation plan for the drone and the movable body automatically. Another object of the present invention is to create an efficient operation plan and to change the operation plan in accordance with circumstances of the operation, improving an operational efficiency of the drone.

Solution to Problem

A drone system according to an aspect of the present invention to achieve the objects described above is a drone system in which a drone and a movable body operate in coordination with each other, the drone performing a predetermined operation in an agricultural field, the movable body allowing the drone to make a takeoff and a landing, the drone system including: a plan determining section that determines a flight plan for the drone and a movement plan for the movable body in accordance with the flight plan; a first instructing section that instructs the drone to execute an operation in accordance with the flight plan; and a second instructing section that instructs the movable body to move or to be on standby in accordance with the movement plan.

In a case of a plurality of agricultural fields, the flight plan may include an operation sequence of the agricultural fields in which the drone is to perform an operation.

The operation sequence of the agricultural fields may be determined to be in order closest to a takeoff point at which the drone takes off from the movable body.

The flight plan and the movement plan may include a relay point at which the drone lands temporarily.

The flight plan and the movement plan may include a takeoff point at which the drone takes off from the movable body and a landing point at which the drone lands on the movable body after completion of an operation.

The landing point may be determined to be a point that is in a vicinity of an operation-completion scheduled point of the drone, allows the movable body to move to the point, and is closest to the operation-completion scheduled point.

In a case where a scheduled point at completion of an operation by the drone is at a predetermined or longer distance from the takeoff point, the plan determining section may determine a point different from the takeoff point as the landing point of the drone.

In a case where a time taken by the drone to fly from an operation-completion scheduled point to the takeoff point is equal to or longer than a predetermined time, the plan determining section may determine a point different from the takeoff point as the landing point of the drone.

The drone system may further include a first determination processing section that determines, during an operation by the drone, based on information concerning a charge amount of a battery included in the drone and a current position of the drone, whether the charge amount is sufficient for the drone to fly from the current position to the landing point, and a first plan changing section that changes, when the charge amount is determined to be insufficient for the drone to fly to the landing point, the flight plan and/or the movement plan.

The first plan changing section may set a relay point in the flight plan and/or the movement plan.

The first plan changing section may change the landing point in the flight plan and/or the movement plan.

The drone system may further include a second determination processing section that determines, during an operation by the drone, based on information concerning a remaining amount of chemical agent included in the drone and a current position of the drone, whether the remaining amount is sufficient for the drone to spread the chemical agent over the agricultural field from the current position to the landing point, and a second plan changing section that changes, when the remaining amount is determined to be insufficient to spread the chemical agent over the agricultural field to the landing point, the flight plan and/or the movement plan.

The second plan changing section may set a relay point in the flight plan and/or the movement plan.

The second plan changing section may change the landing point in the flight plan and/or the movement plan.

The drone system may further include an advance notification receiving section that receives, at a predetermined timing before an operation is completed, an advance notification about completion of the operation being upcoming, from the drone, wherein in response to reception of the advance notification, the plan determining section may determine the landing point of the drone.

Based on a first necessary time necessary for the drone to fly from a current position of the drone to a predetermined point and a second necessary time necessary for the movable body to move from a current position of the movable body to the predetermined point, the predetermined point being a point that is in a vicinity of an operation-completion scheduled point and to which the movable body can move, in a case where the first necessary time is longer than the second necessary time, the predetermined point may be determined as the landing point.

The drone system may further include a suspending action receiving section that receives, during an operation by the drone, a suspending action to suspend the operation.

The drone system may further include a third plan changing section that changes the flight plan and/or the movement plan in response to the suspending action.

The drone system may further include a third instructing section that instructs, during an operation by the drone, in a case where a user of the drone takes a suspending action to suspend the operation with an operating device, the drone and the movable body to execute a suspension plan that is determined in response to the suspending action.

The suspension plan may include a plan that causes the drone being performing an operation to suspend the operation, causes the movable body being moving to suspend the movement, and causes the drone to land on the movable body suspending the movement.

The suspension plan may include a plan that causes the drone being performing an operation to suspend the operation, causes, in a case where the movable body is stopping at a predetermined point, the movable body to be on standby at the predetermined point, and causes the drone to land on the movable body being on standby.

The suspension plan may include a plan that causes the drone being performing an operation to suspend the operation, causes the movable body to move to a predetermined point, and causes the drone to land on the movable body at the predetermined point.

In addition, a drone according to another aspect of the present invention is a drone that performs a predetermined operation in an agricultural field and operates in coordination with a movable body that allows the drone to make a takeoff and a landing, the drone including: a plan determining section that determines a flight plan and a movement plan for the movable body in accordance with the flight plan; a flight control section that executes an operation in accordance with the flight plan; and an instructing section that instructs the movable body to move or to be on standby in accordance with the movement plan.

In addition, a plan management apparatus according to another aspect of the present invention is a plan management apparatus that manages an operation plan for a drone performing a predetermined operation in an agricultural field and a movable body allowing the drone to make a takeoff and a landing, the plan management apparatus including: a plan determining section that determines a flight plan for the drone and a movement plan for the movable body in accordance with the flight plan; a first instructing section that instructs the drone to execute an operation in accordance with the flight plan; and a second instructing section that instructs the movable body to move or to be on standby in accordance with the movement plan.

In addition, a plan management method for a drone system according to another aspect of the present invention is a plan management method for a drone system in which a drone and a movable body operate in coordination with each other, the drone performing a predetermined operation in an agricultural field, the movable body allowing the drone to make a takeoff and a landing, the plan management method causing the drone system to a plan determining process of determining a flight plan for the drone and a movement plan for the movable body in accordance with the flight plan; a first instructing process of instructing the drone to execute an operation in accordance with the flight plan; and a second instructing process of instructing the movable body to move or to be on standby in accordance with the movement plan.

In addition, a plan management program for a drone system according to another aspect of the present invention is a plan management program for a drone system in which a drone and a movable body operate in coordination with each other, the drone performing a predetermined operation in an agricultural field, the movable body allowing the drone to make a takeoff and a landing, the plan management program causing the drone system to a plan determining process of determining a flight plan for the drone and a movement plan for the movable body in accordance with the flight plan; a first instructing process of instructing the drone to execute an operation in accordance with the flight plan; and a second instructing process of instructing the movable body to move or to be on standby in accordance with the movement plan.

Note that the computer program can be provided by download over a network such as the Internet or may be provided being recorded in one of various kinds of computer-readable recording media such as a CD-ROM.

Advantageous Effect of Invention

It is possible to determine, in a system including a drone that executes a predetermined operation by automatic flight and a movable body that transports the drone, an operation plan for the drone and the movable body automatically. Moreover, the drone system makes it possible to create an efficient operation plan and to change the operation plan in accordance with circumstances of the operation, improving an operational efficiency of the drone.

DESCRIPTION OF EMBODIMENT

An embodiment for carrying out the invention of the present application will be described below with reference to the drawings. The drawings are all for exemplification purposes. In a detailed description to be made below, specific details will be described for fostering complete understanding of disclosed embodiments. However, embodiments are not limited to these specific details. In addition, well-known structures and devices are illustrated schematically for simplification of the drawings.

Configuration of Drone

First, a configuration of a drone included in a drone system according to the present invention will be described. In the present specification, a drone refers generally to an aerial vehicle including a plurality of rotary wings irrespective of its type of motive power (electric motor, heat engine, etc.) and its type of control (wireless or wired, autonomous flight or manual control, etc.)

As illustrated in FIG. 1 to FIG. 5, rotary wings 101-1a, 101-1b, 101-2a, 101-2b, 101-3a, 101-3b, 101-4a, and 101-4b (also referred to as rotors) are means for causing a drone 100 to fly, and eight rotary wings (four sets of double-tier rotary wings) are provided, with consideration given to balance of stability of flight, a size of an airframe, and power consumption. The rotary wings 101 are arranged at positions in four directions from a main body 110 of the drone 100, supported by arms extending from the main body 110. That is, in a traveling direction of the drone 100, the rotary wings 101-1a and 101-1b are arranged behind the main body 110 on the left, the rotary wings 101-2a and 101-2b are arranged ahead of the main body 110 on the left, the rotary wings 101-3a and 101-3b are arranged behind the main body 110 on the right, and the rotary wings 101-4a and 101-4b are arranged ahead of the main body 110 on the right. Note that a traveling direction of the drone 100 is a downward direction of the paper of FIG. 1. Below the rotary wings 101, rod-shaped legs 107-1, 107-2, 107-3, and 107-4 extend along rotation axes of the rotary wings 101.

Figure 1:
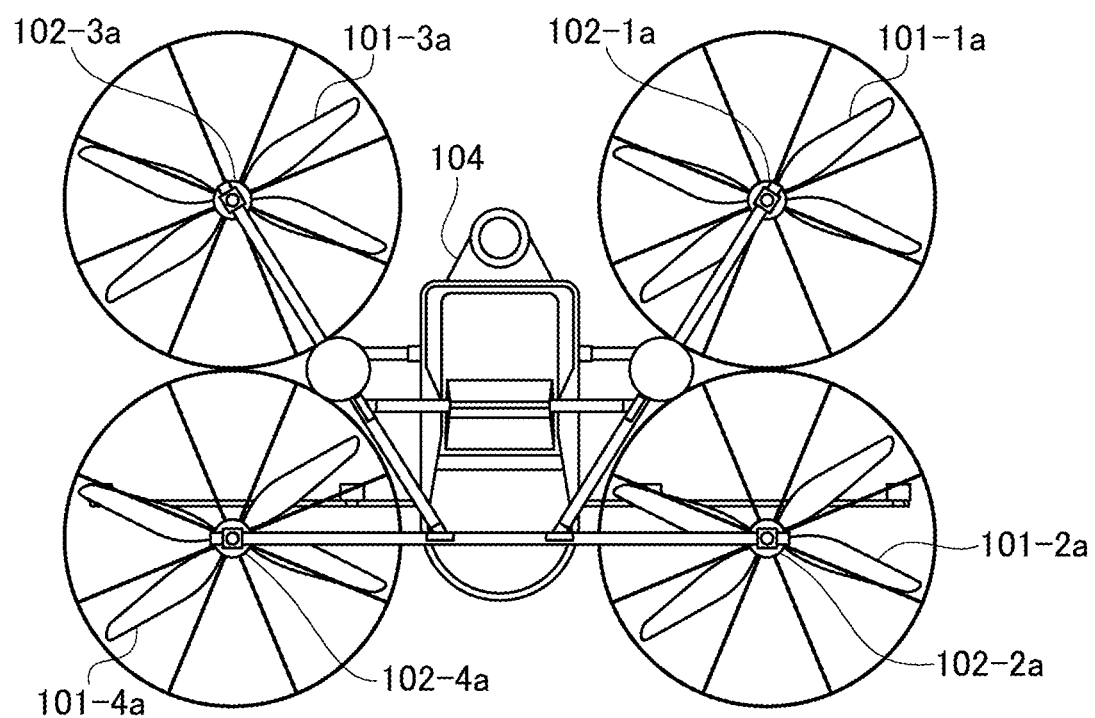
FIG. 1 is a plan view illustrating an embodiment of a drone system according to the invention of the present application.
Figure 2:
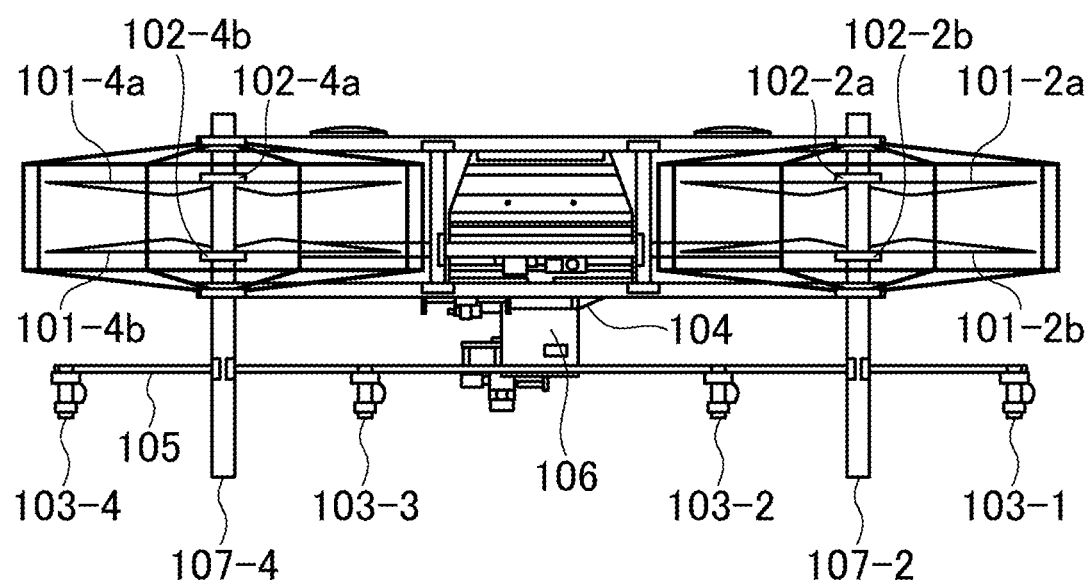
FIG. 2 is a front view of a drone included in the drone system.
Figure 3:
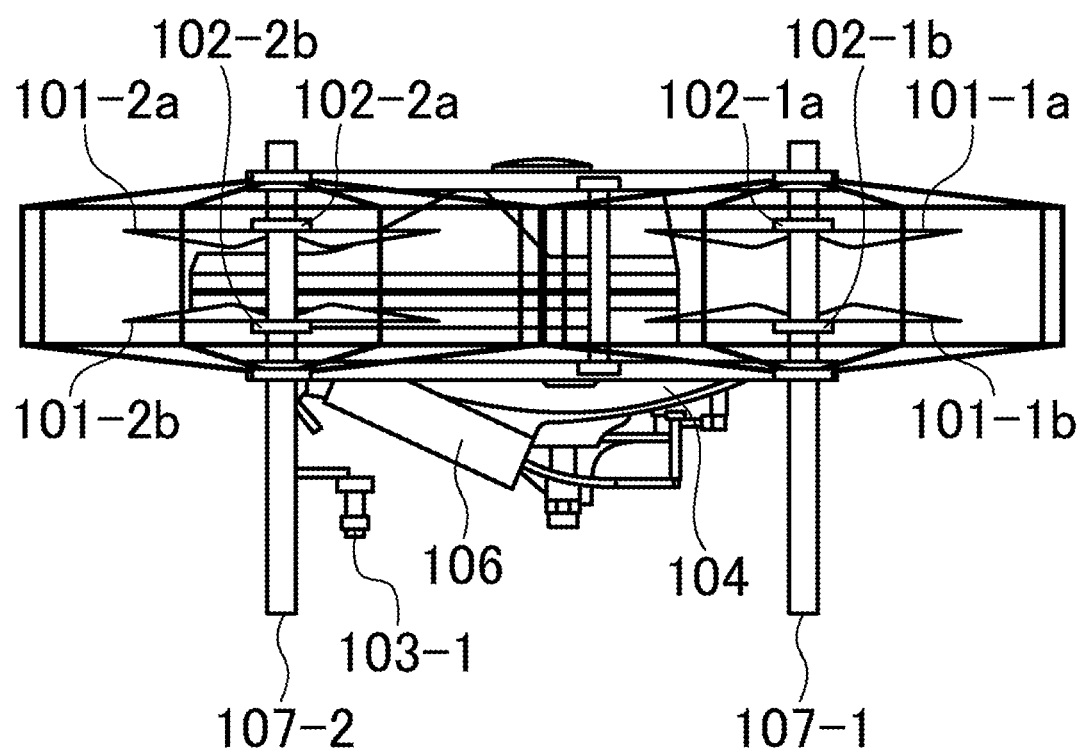
FIG. 3 is a right side view of the drone.
Figure 4:
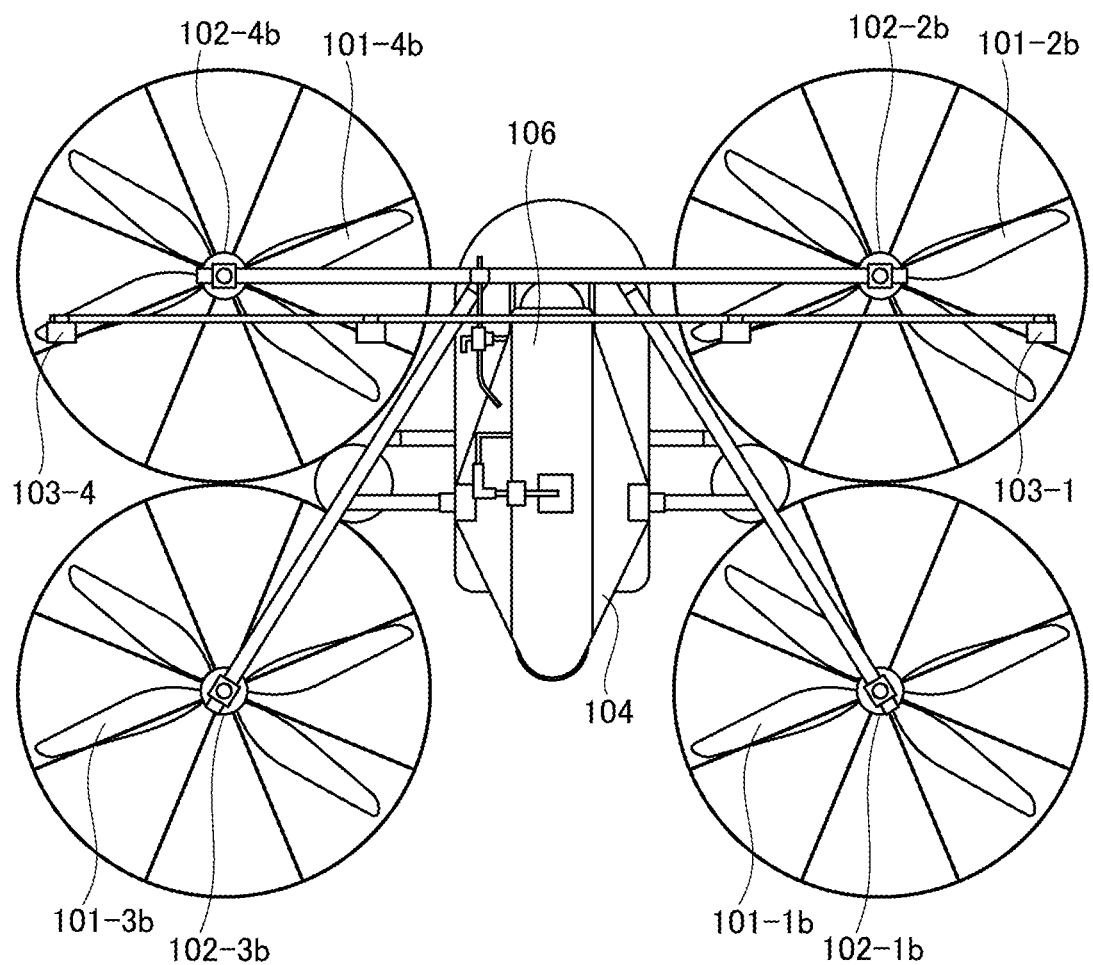
FIG. 4 is a rear view of the drone.
Figure 5:
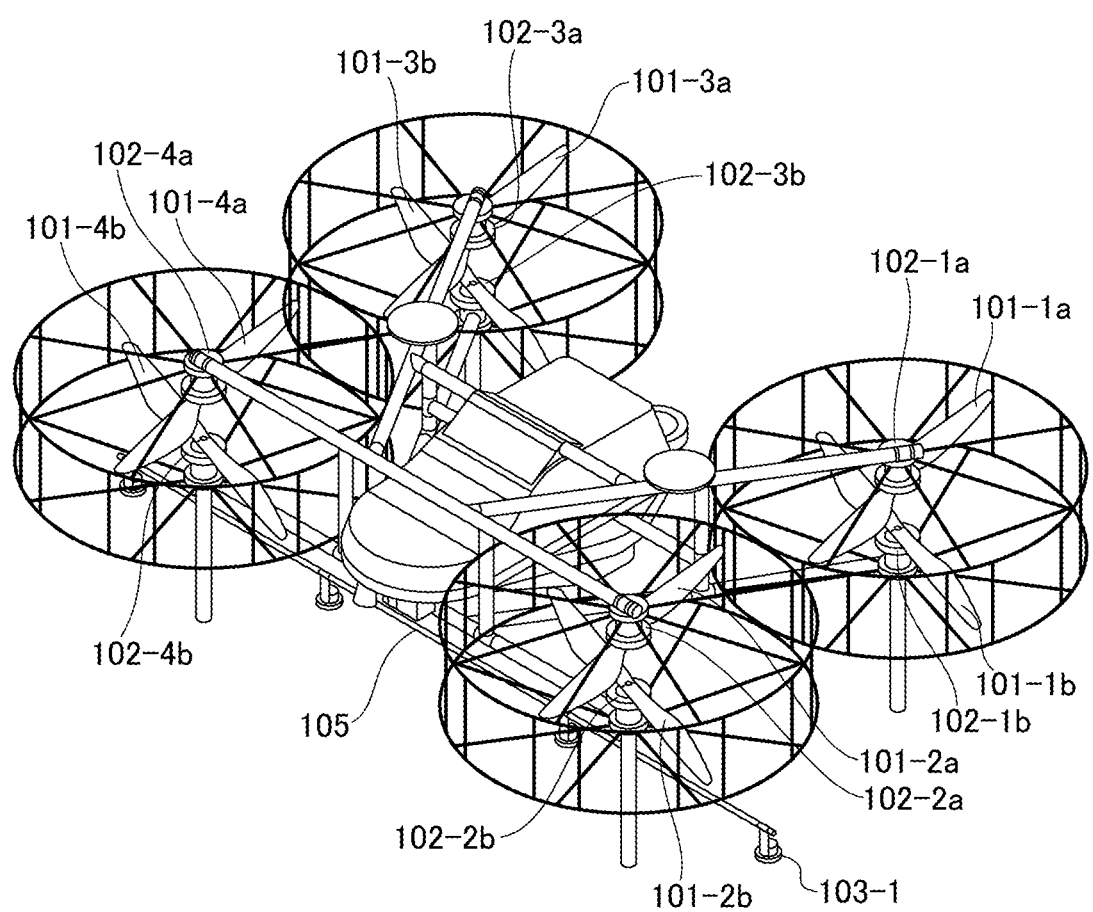
FIG. 5 is a perspective view of the drone.

Motors 102-1a, 102-1b, 102-2a, 102-2b, 102-3a, 102-3b, 102-4a, and 102-4b are means for causing the rotary wings 101-1a, 101-1b, 101-2a, 101-2b, 101-3a, 101-3b, 101-4a, and 101-4b to rotate (typically electric motors but may be engines, etc.), respectively, and are each provided for one rotary wing. The motors 102 are an example of thrusters. Up and down rotary wings of one of the sets (e.g., 101-1a and 101-1b) and their respective motors (e.g., 102-1a and 102-1b) include axes lying on the same line and rotate in directions opposite to each other for stability of flight and the like of the drone. As illustrated in FIG. 2 and FIG. 3, radial members for supporting propeller guards, which are provided to prevent the rotors from interfering with a foreign object, each have a turreted structure rather than a horizontal structure. This is because, in a case of a collision, this structure urges the member to buckle outward of the rotary wing, preventing the member from interfering with the rotor.

Chemical agent nozzles 103-1, 103-2, 103-3, and 103-4 are means for spreading the chemical agent downward, and the number of the chemical agent nozzles provided is four. Note that, in the present specification, a chemical agent refers generally to liquid or powder to be spread over an agricultural field, such as agrochemical, herbicide, liquid fertilizer, insecticide, seeds, and water.

A chemical agent tank 104 is a tank for storing a chemical agent to be spread and is provided at a position close to and below a center of gravity of the drone 100, from a viewpoint of weight balance. Chemical agent hoses 105-1, 105-2, 105-3, and 105-4 are means for connecting the chemical agent tank 104 and the chemical agent nozzles 103-1, 103-2, 103-3, and 103-4, are made of a hard material, and may additionally play a role of supporting the chemical agent nozzles. A pump 106 is means for discharging the chemical agent from the nozzles.

Figure 6:
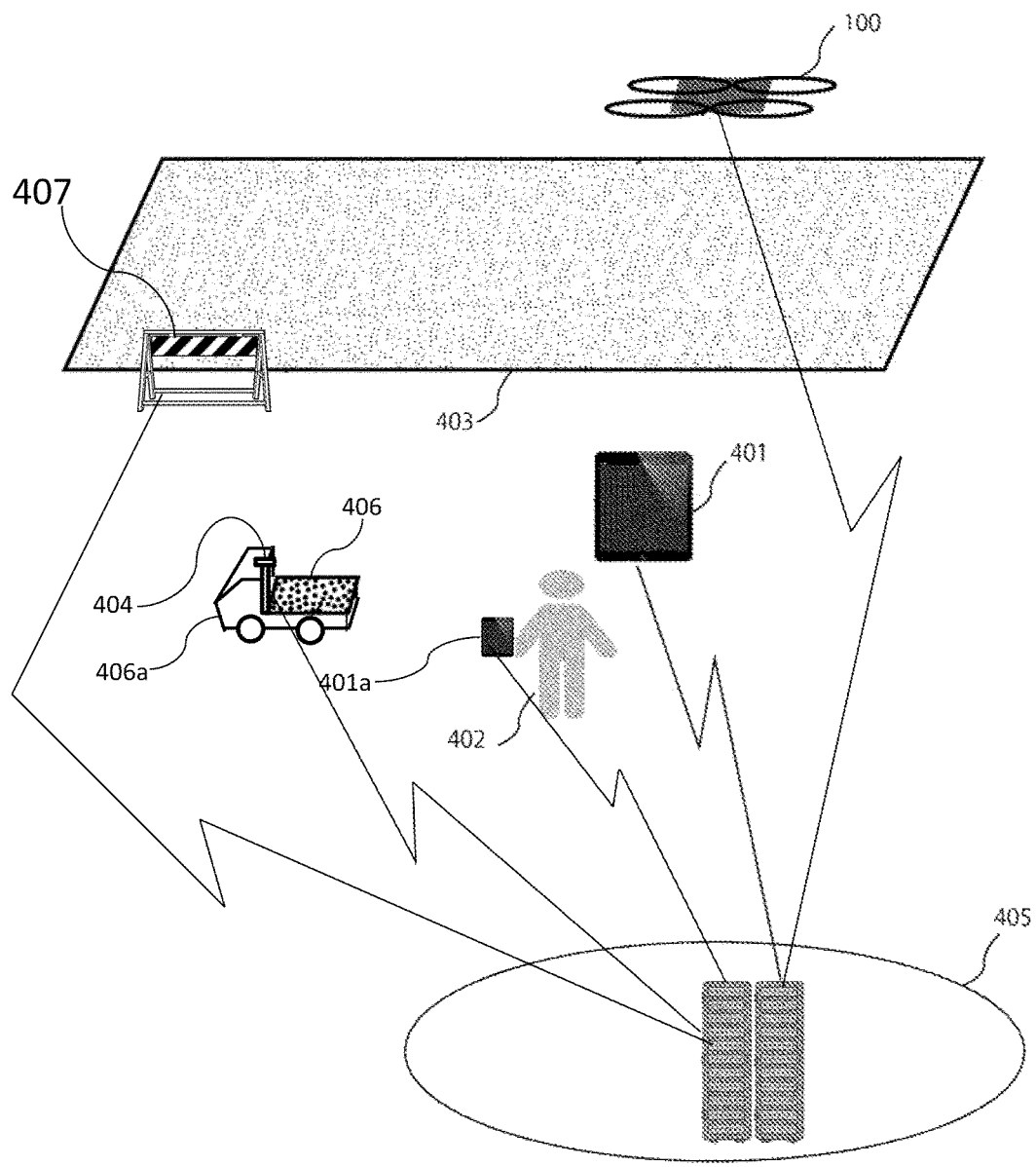
FIG. 6 is a general schematic diagram of the drone system.

FIG. 6 illustrates a general schematic diagram of a drone system according to the invention of the present application. This figure is schematic, and its scale is not exact. In this figure, the drone 100, an operating device 401, a base station 404, a movable body 406a, and a demarcating member 407 are connected to an agriculture cloud 405. A small portable terminal 401a is connected to the base station 404. These constituents of the system may be connected by wireless communication such as Wi-Fi and a mobile telecommunications system, or some or all of them may be connected in a wired manner.

The drone 100 and the movable body 406a exchange information with each other to operate in coordination with each other. On the movable body 406a, the takeoff-landing point 406 is formed. The drone 100 includes a flight control section 21 that controls the flight of the drone 100 and a functional section for exchanging information with the movable body 406a.

An operating device 401 is means for sending a command to the drone 100 in response to an operation made by a user 402 and for displaying information received from the drone 100 (e.g., position, amount of chemical agent, remaining battery level, image taken by a camera, etc.) and may be implemented in a form of mobile information equipment such as a typical tablet terminal on which a computer program runs. The drone 100 according to the invention of the present application is controlled so as to perform autonomous flight and may be configured to allow manual operation in basic operations such as a takeoff and a return and in an emergency situation. In addition to the mobile information equipment, an emergency operating device (not illustrated) having a dedicated function of making an emergency stop may be used (the emergency operating device may be dedicated equipment provided with a large emergency stop button or the like for dealing speedily with an emergency situation). Moreover, a small portable terminal 401a, a smartphone for example, capable of displaying some or all of pieces of information displayed on the operating device 401 may be included in the system in addition to the operating device 401. The system may have a function of changing behavior of the drone 100 based on information received from the small portable terminal 401a. The small portable terminal 401a is connected to, for example, the base station 404, being capable of receiving information and the like from the agriculture cloud 405 via the base station 404.

An agricultural field 403 is a rice field, field, or the like that is to be spread with the chemical agent by the drone 100. In reality, topographic features of the agricultural field 403 are complex, and there may be no topographic map that is available in advance, or a given topographic map may disagree with site conditions of the agricultural field 403. Usually, the agricultural field 403 is adjacent to a house, hospital, school, agricultural field of another crop, road, railroad, or the like. In the agricultural field 403, an obstacle such as a building, an electric wire, or the like may be present.

The base station 404 is a device providing a host unit function in Wi-Fi communication and the like and may be configured to function also as an RTK-GPS base station to provide an accurate position of the drone 100 (the host unit function in the Wi-Fi communication and the RTK-GPS base station may be implemented in independent devices). The base station 404 may be capable of communicating mutually with the agriculture cloud 405 using a mobile telecommunications system such as 3G, 4G, and LTE. In the present embodiment, the base station 404 is loaded on a movable body 406a together with a takeoff-landing point 406.

An agriculture cloud 405 typically includes computers and relevant software operated on a cloud computing service and may be wirelessly connected to the operating device 401 with a mobile telephone line or the like. The agriculture cloud 405 may analyze images of the agricultural field 403 captured by the drone 100, grasp growth conditions of a crop, and perform processing for determining a plan of spreading chemical agent or the like. In addition, the agriculture cloud 405 may provide topographic information and the like on the agricultural field 403 stored therein to the drone 100. Moreover, the agriculture cloud 405 may store flights of the drone 100 and images captured by the drone 100 and perform various kinds of analyses thereon.

The demarcating member 407 is a member for demarcating an operation area that includes and surrounds the agricultural field 403 and in which the movable body 406a and the drone 100 move for operation; examples of the demarcating member 407 include Color Cone®, a traffic cone, a cone bar, a barricade, a field signboard, a fence, and the like. The demarcating member 407 may make demarcation physically or may make demarcation with a light beam such as an infrared ray. The demarcating member 407 is used to notify mainly an intruder outside the operation area that the area is under operation so as to restrict an intrusion into the operation area. The demarcating member 407 is therefore a member that an intruder can see from a distance. The demarcating member 407 is placed by the user 402 at starting of an operation and thus is preferably easy to place and remove. A plurality of demarcating members 407 may be included in the drone system. The demarcating member 407 detects intrusion of an intruder into the operation area and gives information on the intrusion to the movable body 406a, the operating device 401, the small portable terminal 401a, and the like. Note that the intruder includes a human, a vehicle, and other movable bodies.

The small portable terminal 401a is, for example, a smartphone or the like. The small portable terminal 401a includes a display section that displays, as appropriate, information on an action predicted in relation to the operation of the drone 100, specifically, a scheduled time at which the drone 100 is to return to the takeoff-landing point 406 and information on details of operations to be performed by the user 402 after the drone 100 returns. Based on an input performed on the small portable terminal 401a, behavior of the drone 100 and the movable body 406a may be changed. The portable terminal is capable of receiving information from both the drone 100 and the movable body 406a. The information from the drone 100 may be sent to the small portable terminal 401a via the movable body 406a.

In general, the drone 100 takes off from the takeoff-landing point 406 located outside the agricultural field 403, spreads the chemical agent over the agricultural field 403, and returns to the takeoff-landing point 406 after the spreading or when replenishment with the chemical agent, electric recharging, or the like is needed. A flight plan for the drone 100 and a movement plan for the movable body 406a are determined by the agriculture cloud 405, and the drone 100 and the movable body 406a fly and move based on the flight plan and the movement plan determined by the agriculture cloud 405, respectively, to perform an operation of spreading chemical agent or the like.

Figure 7:
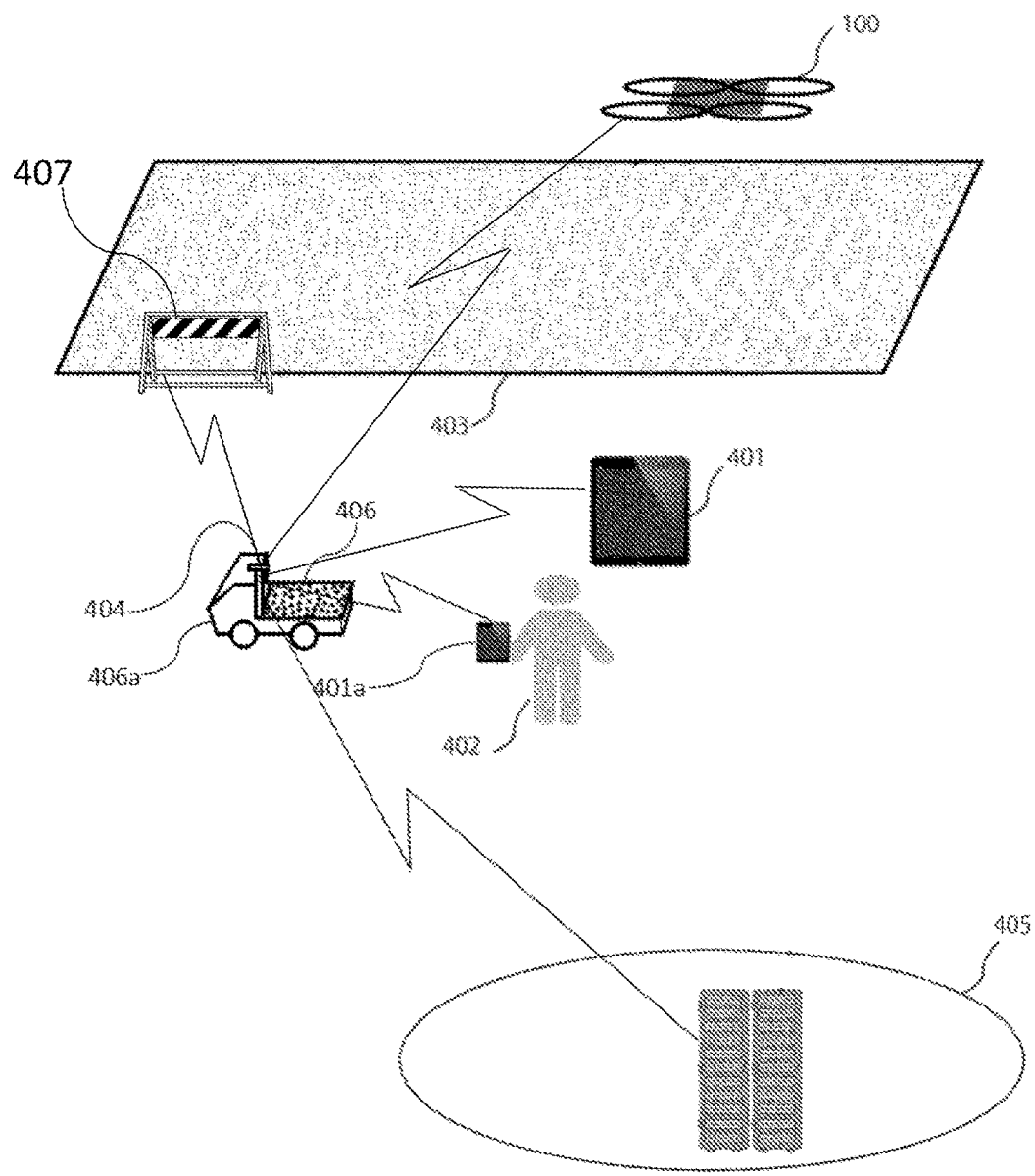
FIG. 7 is a general schematic diagram of another example of the drone system.

Note that, as illustrated in FIG. 7, the drone system according to the invention of the present application may have a configuration in which the drone 100, the operating device 401, the small portable terminal 401a, the agriculture cloud 405, and the demarcating member 407 are connected to the base station 404.

Figure 8:
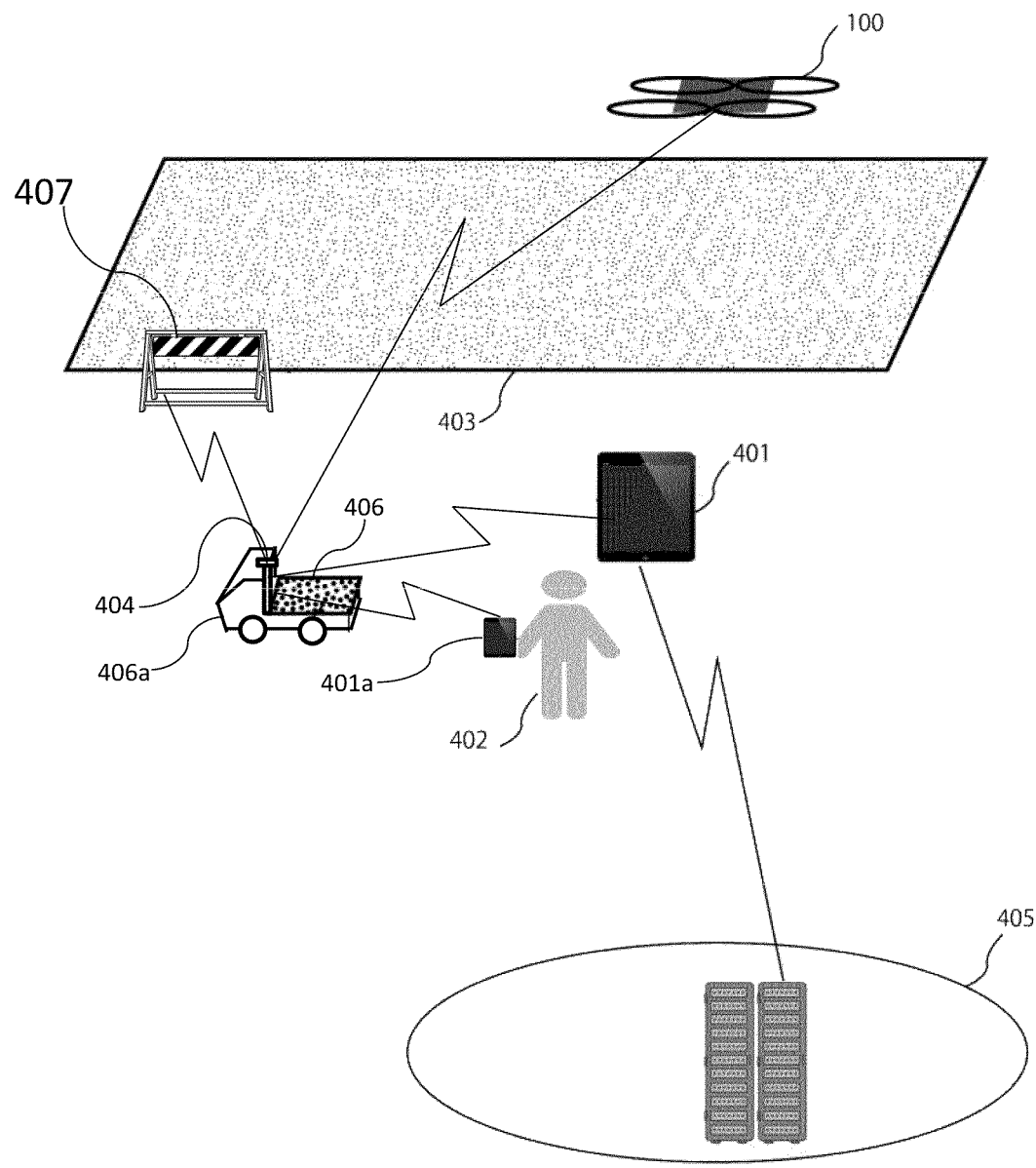
FIG. 8 is a general schematic diagram of still another example of the drone system.

Alternatively, as illustrated in FIG. 8, the drone system according to the invention of the present application may have a configuration in which the drone 100, the operating device 401, the small portable terminal 401a, and the demarcating member 407 are each connected to the base station 404, and only the operating device 401 is connected to the agriculture cloud 405.

Figure 9:
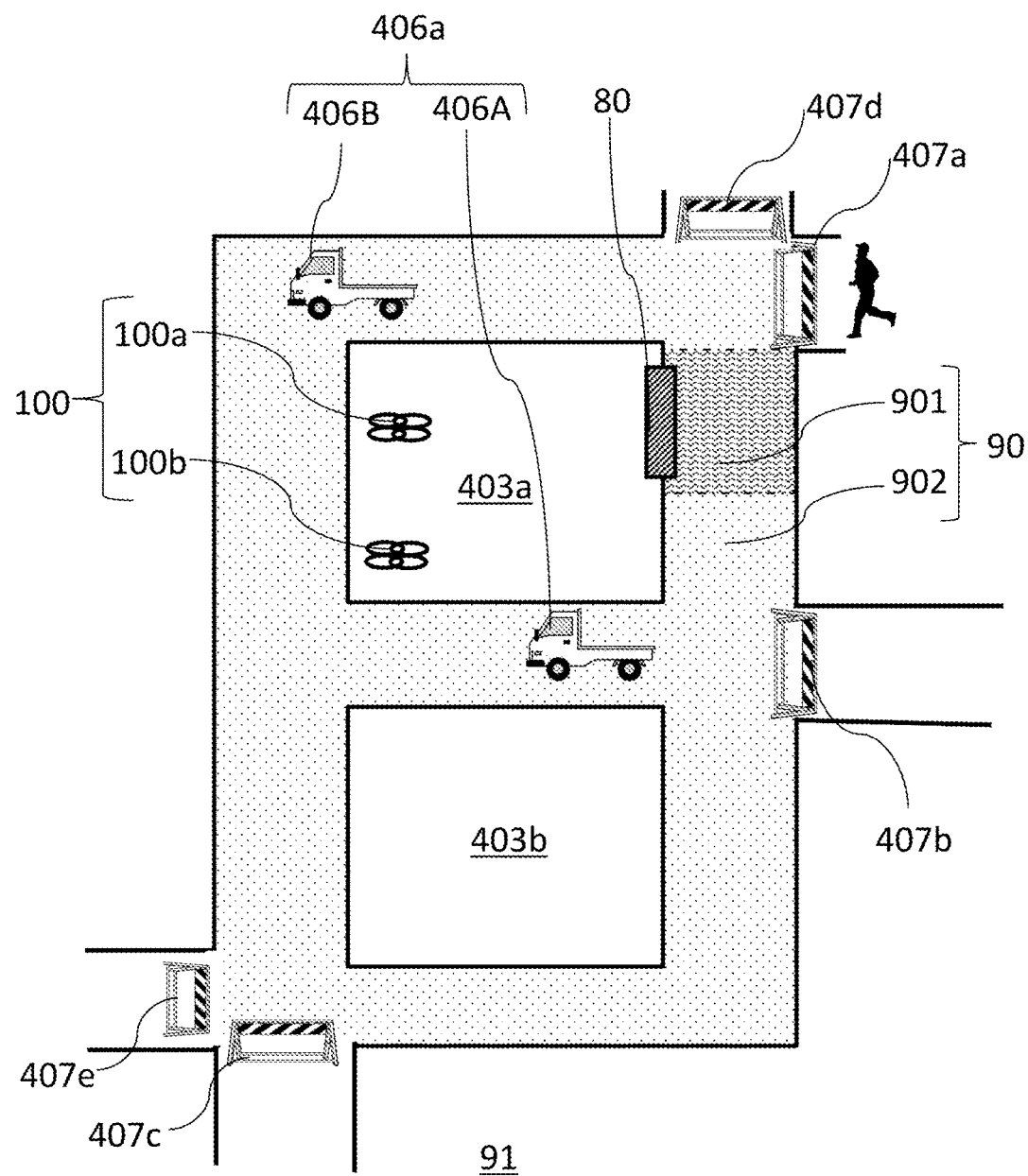
FIG. 9 is a schematic diagram illustrating arrangement of agricultural fields in which the drone performs an operation, an automated-traveling permitted area where the movable body travels, and demarcating members.

As illustrated in FIG. 9, the drone 100 flies over agricultural fields 403a and 403b to execute an operation in the agricultural fields. The movable body 406a automatically travels in an automated-driving permitted area 90 that is provided around the agricultural fields 403a and 403b. In the technical scope of the present invention, the numbers of drones 100 and movable bodies 406a may be each one or more; in the drawing, two drones 100a and 100b and two movable bodies 406A and 406B are illustrated.

The automated-driving permitted area 90 is, for example, a farm road. The agricultural fields 403a and 403b and the automated-driving permitted area 90 constitute an operation area. The automated-driving permitted area 90 is divided into a movement permitted area 901 where the movable body 406a can move, but the drone 100 cannot make a landing and a stoppage permitted area 902 where the movable body 406a can move and the drone 100 can land on the movable body 406a. A reason that the drone 100 cannot make a landing is that, for example, an obstacle 80 such as a guardrail, a utility pole, an electric wire, a warehouse, and a tomb is installed between the area and the agricultural field 403a.

An outside of the automated-driving permitted area 90 is an automated-driving prohibited area 91. The automated-driving permitted area 90 and the automated-driving prohibited area 91 are separated from each other by demarcating members 407a, 407b, and 407c. In other words, the demarcating members 407a, 407b, and 407c are arranged at entrances to the automated-driving permitted area 90.

The drone 100 takes off from the movable body 406a and executes an operation in the agricultural fields 403a and 403b. During the operation in the agricultural fields 403a and 403b, the drone 100 suspends the operation as appropriate and returns to the movable body 406a, where replenishment with a battery 502 and chemical agent is performed. Upon completion of an operation in a predetermined agricultural field, the drone 100 is moved aboard the movable body 406a to a vicinity of another agricultural field and then takes off from the movable body 406a again to start an operation in the other agricultural field. In this manner, the movement of the drone 100 within the automated-driving permitted area 90 is performed while the drone 100 is aboard the movable body 406a in principle, and the movable body 406a transports the drone 100 to a vicinity of an agricultural field where an operation is to be performed. With this configuration, the battery 502 of the drone 100 can be saved. In addition, since the movable body 406a stores batteries 502 and chemical agent with which the drone 100 can be replenished, a configuration in which the movable body 406a moves to and is on standby at a vicinity of an agricultural field where the drone 100 is in operation, a time necessary for the replenishment of the drone 100 can be shortened.

An outside of the automated-driving permitted area 90 is an automated-driving prohibited area 91. The automated-driving permitted area 90 and the automated-driving prohibited area 91 are separated from each other by demarcating members 407a, 407b, and 407c. The automated-driving permitted area 90 and the automated-driving prohibited area 91 are separated from each other by various obstacles; additionally, the demarcating members 407a, 407b, and 407c may be arranged on roads that are formed continuously. In other words, the demarcating members 407a, 407b, and 407c are arranged at entrances to the automated-driving permitted area 90.

Figure 10:
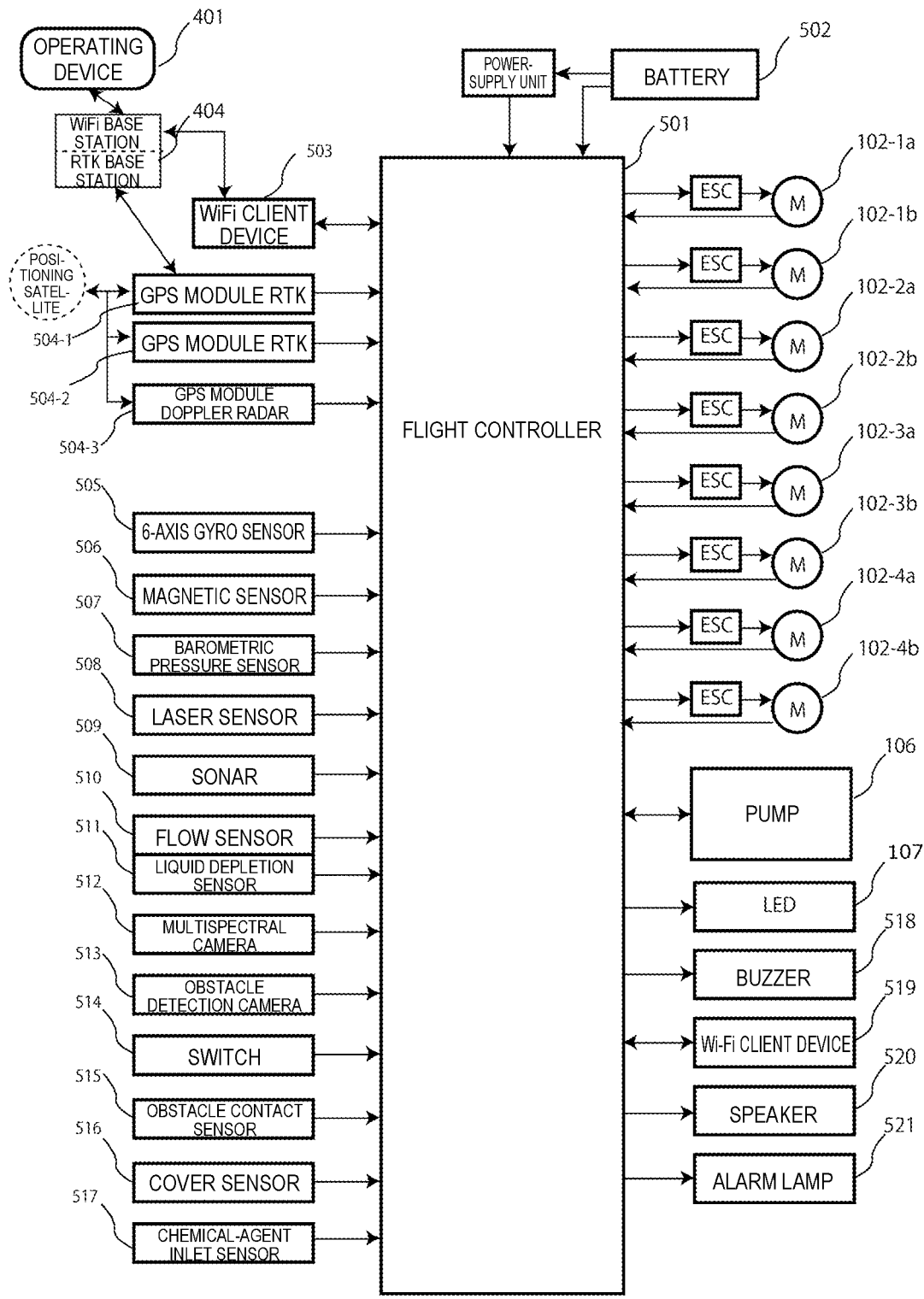
FIG. 10 is a schematic diagram illustrating control functions of the drone.

FIG. 10 is a block diagram illustrating control functions in an embodiment of a drone for spreading chemical agent according to the invention of the present application. A flight controller 501 is a constituent component that governs control of the entire drone; specifically, the flight controller 501 may be an embedded computer including a CPU, a memory, relevant software, and the like. The flight controller 501 controls a flight of the drone 100 by controlling the numbers of revolutions of the motors 102-1a, 102-1b, 102-2a, 102-2b, 102-3a, 102-3b, 104-a, and 104-b via control means such as electronic speed controls (ESCs) based on input information received from the operating device 401 and input information obtained from various kinds of sensors described later. The flight controller 501 is configured to receive feedback on actual numbers of revolutions of the motors 102-1a, 102-1b, 102-2a, 102-2b, 102-3a, 102-3b, 104-a, and 104-b so as to monitor whether their rotations are normal. Alternatively, the flight controller 501 may be configured to receive feedback on the rotations of the rotary wings 101 from optical sensors or the like provided to the rotary wings 101.

Software used for the flight controller 501 can be rewritten for enhancement/modification of a function, fixing a problem, or the like via a storage medium or the like or communication means such as Wi-Fi communication and USB. In this case, the software is protected by encryption, checksum, digital signature, virus-check software, and the like so as not to be rewritten by fraudulent software. In addition, calculation processing used by the flight controller 501 for the control may be partly executed by the operating device 401 or another computer that is present on the agriculture cloud 405 or at another location. Some or all of the constituent components of the flight controller 501 may be duplexed owing to its great importance.

The flight controller 501 can receive a necessary command from the operating device 401 and send necessary information to the operating device 401 by exchanging data with the operating device 401 via a Wi-Fi client unit function 503 and additionally the base station 404. In this case, the communication may be encrypted to prevent fraudulent activities such as interception, spoofing, and hacking a device. The base station 404 has a communication function using Wi-Fi as well as a function of an RTK-GPS base station. By combining signals from the RTK base station and signals from GPS satellites, an absolute position of the drone 100 can be measured with a precision of about several centimeters by the flight controller 501. The flight controller 501 may be duplexed/multiplexed owing to their great importance; in addition, redundant flight controllers 501 may be controlled to use different satellites so as to prepare for failure of some GPS satellite.

A 6-axis gyro sensor 505 is means for measuring accelerations of an airframe of the drone 100 in three directions orthogonal to one another (additionally, means for calculating velocities by integrating the accelerations). The 6-axis gyro sensor 505 is means for measuring changes in attitude angles, namely, angular velocities, of the airframe of the drone 100 in the three directions described above. A geomagnetic sensor 506 is means for measuring a direction of the airframe of the drone 100 by measuring the Earth's magnetic field. A barometric pressure sensor 507 is means for measuring barometric pressure; the barometric pressure sensor 507 can also measure an altitude of the drone 100 indirectly. A laser sensor 508 is means for measuring a distance between the drone airframe and the Earth's surface by using reflection of laser light; the laser sensor 508 may use infrared (IR) laser. A sonar 509 is means for measuring a distance between the airframe of the drone 100 and the Earth's surface by using reflection of a sound wave such as an ultrasonic wave. These sensors and the like may be selected in accordance with a cost target and performance requirements of the drone 100. In addition, a gyro sensor (angular velocity sensor) for measuring an inclination of the airframe, an anemometer sensor for measuring a force of wind, and the like may be added. These sensors and the like may be duplexed or multiplexed. In a case where there are a plurality of sensors provided for the same purpose, the flight controller 501 may use only one of the sensors, and if a failure occurs in the one sensor, another one of the sensors may be switched to and used as an alternative sensor. Alternatively, the plurality of sensors may be used simultaneously, and the flight controller 501 may be configured to deem that a failure occurs if measurement results from the sensors disagree.

Flow sensors 510 are means for measuring flow rates of the chemical agent and are provided at a plurality of locations on channels from the chemical agent tank 104 to the chemical agent nozzles 103. A liquid depletion sensor 511 is a sensor for sensing whether an amount of the chemical agent falls to or below a predetermined amount. A multispectral camera 512 is means for capturing an image of the agricultural field 403 to acquire data to be used for image analysis. An intruder detection camera 513 is a camera for detecting an intruder for the drone; the intruder detection camera 513 is a device of a different kind from that of the multispectral camera 512 because its image properties and an orientation of its lens are different from those of the multispectral camera 512. A switch 514 is means with which the user 402 of the drone 100 makes various settings. An intruder contact sensor 515 is a sensor for detecting that the drone 100, particularly a portion of its rotor or its propeller guard has come into contact with an intruder such as an electric wire, a building, a human body, a tree, a bird, and another drone. Note that the 6-axis gyro sensor 505 may substitute for the intruder contact sensor 515. A cover sensor 516 is a sensor for detecting that a cover of an operation panel or a cover for an internal maintenance of the drone 100 is in an open state. A chemical-agent inlet sensor 517 is a sensor for detecting that an inlet of the chemical agent tank 104 is in an open state. These sensors and the like may be selected in accordance with a cost target and performance requirements of the drone and may be duplexed or multiplexed. In addition, a sensor may be provided in the base station 404, the operating device 401, or another location outside of the drone 100, and information read by the sensor may be sent to the drone. For example, an anemometer sensor may be provided in the base station 404, and information concerning a force and a direction of wind may be sent to the drone 100 via Wi-Fi communication.

The flight controller 501 sends a control signal to the pump 106 to adjust an amount of the chemical agent to be discharged or stop discharging the chemical agent. The flight controller 501 is configured to receive feedback on current conditions (e.g., the number of revolutions) of the pump 106.

An LED 107 is display means for informing an operator of the drone of a state of the drone. In place of or in addition to the LED, display means such as a liquid crystal display may be used. A buzzer 518 is output means for indicating the state (particularly an error state) of the drone using an aural signal. A Wi-Fi client unit function 519 is an optional constituent component that communicates with an external computer or the like to transfer, for example, software separately from the operating device 401. In place of or in addition to the Wi-Fi client unit function, other kinds of wireless communication means such as infrared communication, Bluetooth®, ZigBee®, and NFC, or wired communication means such as USB connection may be used. In place of the Wi-Fi client unit function, a mobile telecommunications system such as 3G, 4G, and LTE may be used to enable the drone and the external computer to communicate with each other. A speaker 520 is output means for indicating the state (particularly an error state) of the drone using recorded human voice, synthesized voice, or the like. In some weather conditions, a visual display by the drone 100 during flight is difficult to see; in this case, using voice to transmit the state is effective. An alarm lamp 521 is display means such as a strobe light for indicating the state (particularly an error state) of the drone. These kinds of input/output means may be selected in accordance with a cost target and performance requirements of the drone and may be duplexed or multiplexed.

—Configuration of Movable Body

Figure 11:
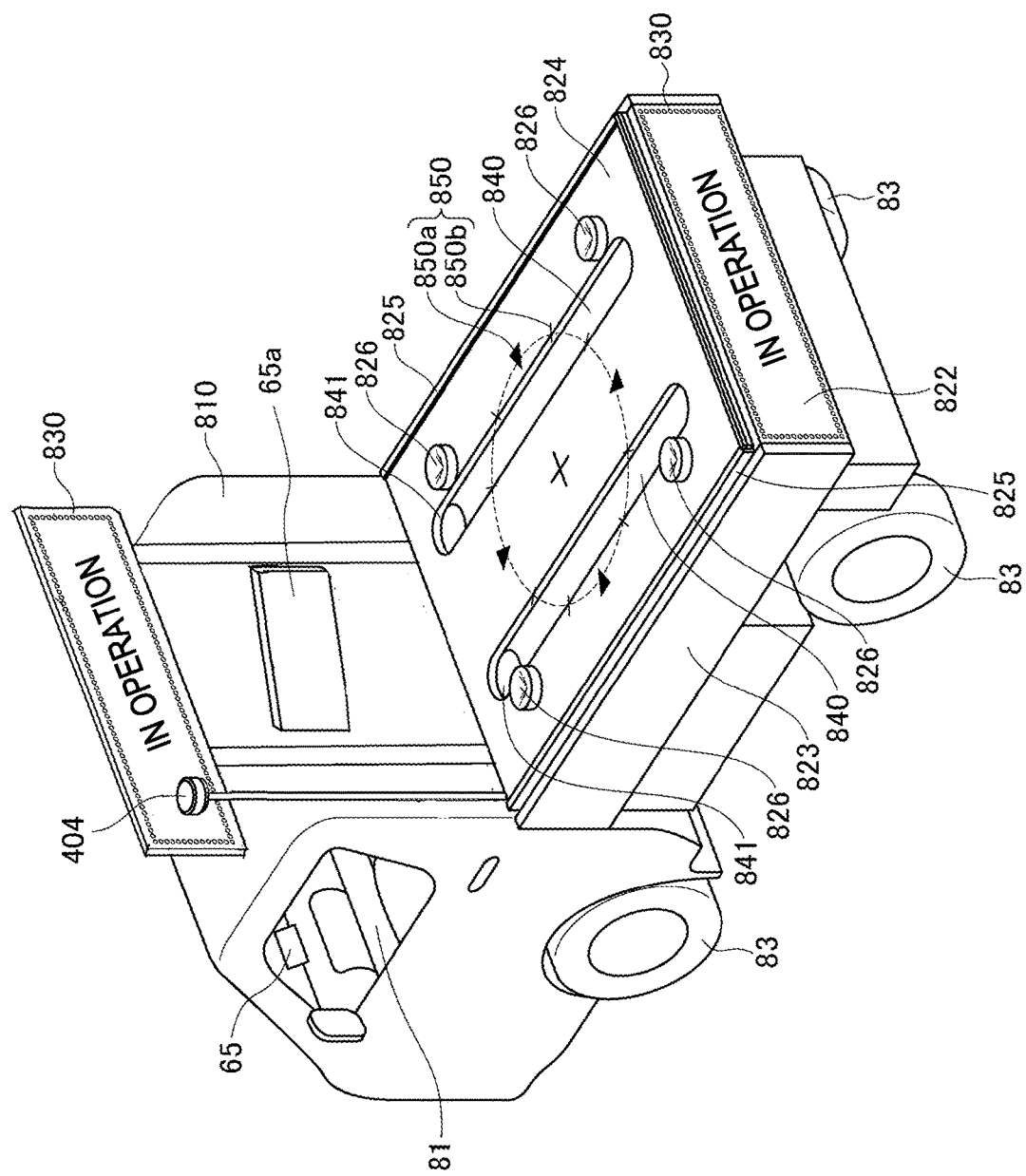
FIG. 11 is a schematic perspective view of a scene of a movable body according to the invention of the present application.
Figure 12:
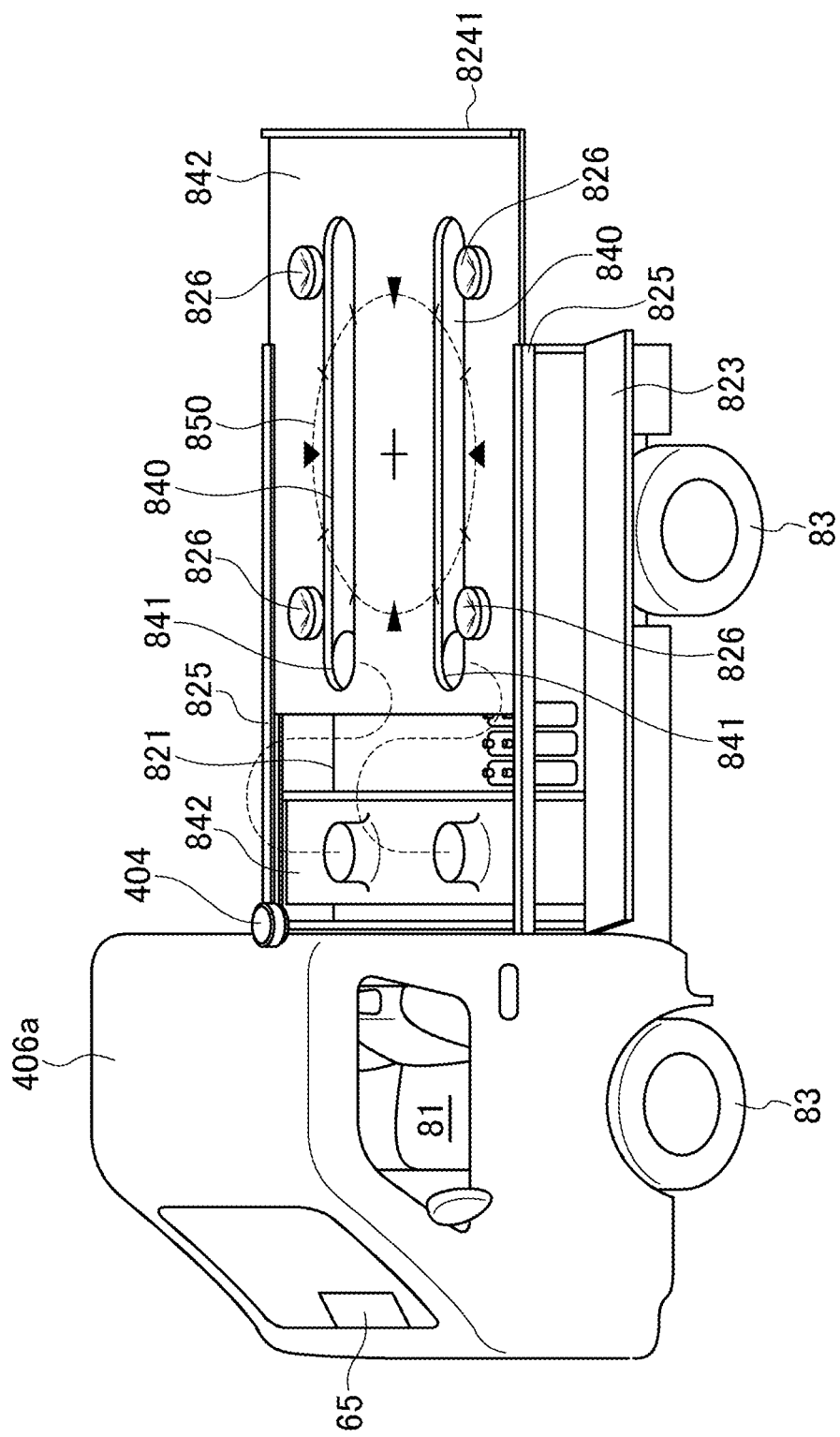
FIG. 12 is a schematic perspective view of the movable body illustrating how an upper plate on which the drone is placed is slid rearward.

The movable body 406a illustrated in FIG. 11 and FIG. 12 is an apparatus that receives information possessed by the drone 100 and notifies the user 402 of the information as appropriate, and that accepts an input from the user 402 and sends the input to the drone 100. In addition, the movable body 406a is capable of moving with the drone 100 aboard. The movable body 406a is capable of being driven by the user 402 and may be capable of moving autonomously. Although the movable body 406a in the present embodiment is assumed to be a vehicle such as an automobile, more specifically a mini truck, the movable body 406a may be an appropriate land movable body such as a railroad car or may be a boat or an aerial vehicle. The movable body 406a may be driven by an appropriate driving source such as gasoline, electricity, and fuel cells.

The movable body 406a is a vehicle in which an occupant seat 81 is arranged on a front side of the vehicle in its traveling direction and a platform 82 on a rear side of the vehicle in the traveling direction. On a bottom side of the movable body 406a, four wheels 83 are arranged to be capable of being driven, as an example of moving means. The occupant seat 81 allows the user 402 to sit thereon.

In a vicinity of the occupant seat 81, a display section 65 that displays the movable body 406a and a state of the drone 100 is arranged. The display section 65 may be a device with a screen or may be implemented as a mechanism that projects information onto a windshield. In addition to the display section 65, a back-side display section 65a may be installed on a back side of a vehicle body 810 with which the occupant seat 81 is covered. With respect to the vehicle body 810, an angle of the back-side display section 65a can be changed laterally, and the user 402 working on a rear side or a lateral side of the platform 82 can acquire information by watching a screen of the rear-side display section 65a.

At a front left corner of the platform 82 of the movable body 406a, the base station 404, which has a shape made by joining a disk-like member to an upper end of a round bar, extends upward to be higher than the occupant seat 81. Note that the base station 404 may have any shape and may be located at any position. With the configuration in which the base station 404 is located on the occupant seat 81 side of the platform 82, the base station 404 is unlikely to hinder the drone 100 from making a takeoff and a landing, as compared with a configuration in which the base station 404 is located on a rear side of the platform 82.

The platform 82 has a trunk 821 for storing a battery 502 for the drone 100 and chemical agent with which the chemical agent tank 104 of the drone 100 is to be replenished. The trunk 821 is a space surrounded by the vehicle body 810 with which the occupant seat 81 is covered, a rear plate 822, a pair of side plates 823 and 823, and an upper plate 824. The rear plate 822 and the side plates 823 are also called "gates". On upper portions of both edges of the rear plate 822, rails 825 are disposed, extending along upper edges of the side plates 823 up to the vehicle body 810 on the back side of the occupant seat 81. The upper plate 824 serves as a takeoff-landing area being the takeoff-landing point 406, which allows the drone 100 to be placed thereon and to make a takeoff and a landing; the upper plate 824 is slidable forward and backward in the traveling direction along the rails 825. The rails 825 serve as ribs that protrude upward from a plane of the upper plate 824, preventing the drone 100 placed on the upper plate 824 from slipping out of right and left edges of the movable body 406a. In addition, the upper plate 824 is formed with a rib 8241 that protrudes upward to the same extent as the rails 825.

At an upper portion of the vehicle body 810 and on a rear side of the rear plate 822 in the traveling direction, an electronic warning board 830 displaying a notice of the drone system being in operation may be arranged. The electronic warning board 830 may be a display that distinguishingly displays a notice of the drone 100 being in operation and a notice of the drone 100 being out of operation by using colors, turning on and off, or the like, or may be capable of displaying characters or pictures. The electronic warning board 830 at the upper portion of the vehicle body 810 may be capable of stretching up above the vehicle body 810 and providing a display on both sides of the electronic warning board 830. With this configuration, a warning can be visually recognized from the rear even when the drone 100 is placed on the platform 82. In addition, the warning can be visually recognized from ahead of the movable body 406a in the traveling direction. With the electronic warning board 830 that can be visually recognized from the front and the rear, time and trouble to place the demarcating members 407 can be partially saved.

The upper plate 824 may be manually slidable or may automatically slide by a rack-and-pinion mechanism or the like. After the upper plate 824 is slid rearward, an item can be put into the trunk 821 from above the platform 82 or can be taken out from the trunk 821. In a mode where the upper plate 824 is slid rearward, the upper plate 824 and the vehicle body 810 are sufficiently separated from each other, and thus the drone 100 can take off from and land on the takeoff-landing point 406.

On the upper plate 824, four leg receiving members 826 to which the legs 107-1, 107-2, 107-3, and 107-4 of the drone 100 can be fixed are arranged. The leg receiving members 826 are, for example, disk-like members that are placed at positions corresponding to the four legs 107-1, 107-2, 107-3, and 107-4 of the drone 100, and each of which has an upper face that recesses in a truncated-cone shape. Bottoms of truncated-cone-shaped recesses of the leg receiving members 826 and tips of the legs 107-1, 107-2, 107-3, and 107-4 may be shaped such that each bottom and a corresponding tip fit together. When landing on the leg receiving members 826, the legs 107-1, 107-2, 107-3, and 107-4 of the drone 100 slide on conical surfaces of the leg receiving members 826, so that tips of the legs 107-1, 107-2, 107-3, and 107-4 are guided to bottom portions of the truncated cones. The drone 100 can be fixed to the leg receiving members 826 automatically or manually by an appropriate mechanism, so that when the movable body 406a moves with the drone 100 aboard, the drone 100 can be transported safely without excessively shaken or dropped. The movable body 406a can sense whether the drone 100 is fixed to the leg receiving members 826.

Substantially at a center portion of the upper plate 824, a circle light 850 that displays a guide to a takeoff-landing position for the drone 100 is arranged. The circle light 850 is formed with lamps that are arranged substantially in a circular pattern, and the lamps can each turn on and off individually. In the present embodiment, a circle light 850 is constituted of four large lamps 850a that are arranged every about 90 degrees on the circumference and small lamps 850b every two of which are arranged between adjacent large lamps 850a. The circle light 850 displays a flying direction after the drone 100 makes a takeoff or a flying direction in which the drone 100 makes a landing by lighting one or more of the lamps 850a and 850b. The circle light 850 may be constituted of one annular lamp that can partly turn on or off.

The pair of side plates 823 is coupled to the platform 82 at its bottom edges with hinges, by which the side plates 823 can be laid down outward. FIG. 9 illustrates how a side plate 823 on the left side in the traveling direction is laid down outward. After the side plate 823 is laid down outward, it is possible to put an item to be stored or take out a stored item through a lateral side of the movable body 406a. The side plates 823 can be fixed to be substantially parallel to a bottom face of the trunk 821, so that the side plates 823 are available as workbenches.

A pair of the rails 825 forms a mode switching mechanism. The hinges used to couple the side plates 823 to the platform 82 may be included in the mode switching mechanism. In a mode in which the upper plate 824 is arranged to cover above the trunk 821, and the side plates 823 are erected to cover lateral faces of the trunk 821, the movable body 406a moves. When the movable body 406a is at a stationary, the movable body 406a can be switched to a mode in which the upper plate 824 is slid rearward or a mode in which the side plates 823 are laid down, where the user 402 can approach an inside of the trunk 821.

While the drone 100 is on the takeoff-landing point 406, replenishment with a battery 502 can be performed. The replenishment with a battery 502 includes charging the battery 502 built in and replacing the battery 502. In the trunk 821, a charging device for batteries 502 is stored and can charge batteries 502 stored in the trunk 821. Alternatively, the drone 100 may include a mechanism of an ultracapacitor in place of the battery 502, and a charger for the ultracapacitor may be stored in the trunk 821. In this configuration, while the drone 100 is fixed to the leg receiving members 826, the battery 502 equipped with the drone 100 can be fast-charged via the legs of the drone 100.

While the drone 100 is on the takeoff-landing point 406, the chemical agent tank 104 can be replenished with chemical agent to be reserved in the chemical agent tank 104. In the trunk 821, appropriate constituent components for dilution and mixing may be stored, such as a dilution-mixing tank for diluting and mixing chemical agent, a stirring mechanism, a pump and a hose for sucking the chemical agent from the dilution-mixing tank and pouring the chemical agent into the chemical agent tank 104. In addition, a replenishment hose that extends upward from the trunk 821 above the upper plate 824 and can be connected to an inlet of the chemical agent tank 104 may be provided.

On an upper-surface side of the upper plate 824, liquid-waste ditches 840 and liquid-waste holes 841 that guide chemical agent discharged from the chemical agent tank 104 are formed. The numbers of the liquid-waste ditches 840 and liquid-waste holes 841 arranged are each two, so that a liquid-waste ditch 840 is located below the chemical agent nozzles 103 irrespective of whether the drone 100 lands on the movable body 406a facing the right or the left. The liquid-waste ditches 840 are ditches with a predetermined width that are formed substantially straight, pass positions of the chemical agent nozzles 103, extend along a lengthwise direction of the movable body 406a, and are slightly inclined toward the occupant seat 81. At ends of the liquid-waste ditches 840 on the occupant seat 81 side, the liquid-waste holes 841 that penetrate the upper plate 824 to guide chemical solution into the inside of the trunk 821 are provided. The liquid-waste holes 841 communicate with a liquid-waste tank 842 that is installed inside the trunk 821 and substantially directly below the liquid-waste holes 841.

Before chemical agent is poured into the chemical agent tank 104, an air bleeding operation to discharge gas, mainly air, filling the chemical agent tank 104 to the outside is performed. At this time, an operation to discharge chemical agent from an outlet of the chemical agent tank 104 is needed. In addition, after the drone 100 completes its operation, an operation to discharge chemical agent from the chemical agent tank 104 is needed. With the configuration in which the upper plate 824 is formed with the liquid-waste ditches 840 and the liquid-waste holes 841, when chemical agent is poured into or discharged from the chemical agent tank 104 while the drone 100 is placed on the upper plate 824, liquid waste can be guided to the liquid-waste tank 842, so that the chemical agent can be poured and discharged safely.

—Functional Blocks of Movable Body

Figure 13:
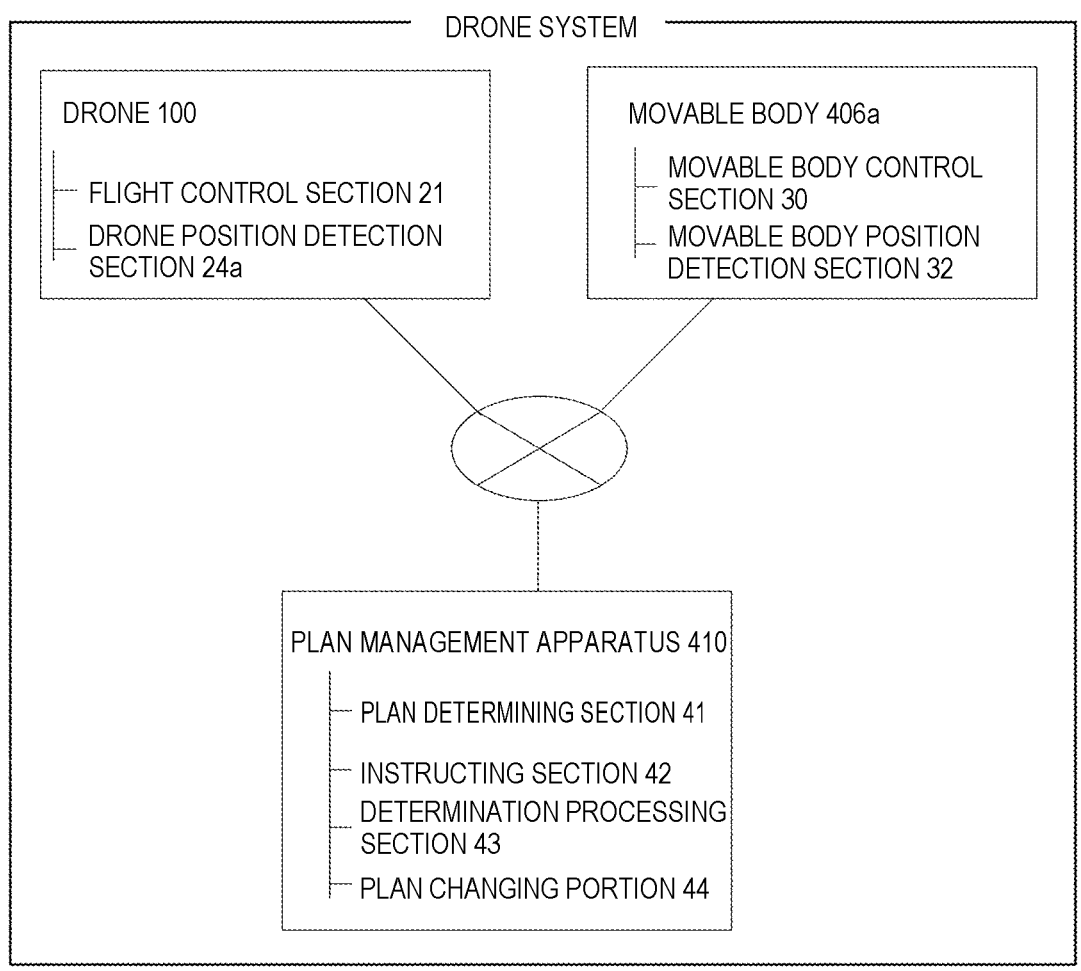
FIG. 13 is a functional block diagram illustrating functions of the drone system.

As illustrated in FIG. 13, the movable body 406a includes a movement control section 30 and a movable-body position detection section 32.

The movement control section 30 is a functional section that controls movement and stoppage of the movable body 406a in accordance with a movement plan determined by a plan management apparatus 410.

The movable-body position detection section 32 is a functional section that detects current position coordinates of the movable body 406a. The current position coordinates of the movable body 406a detected by the movable-body position detection section 32 are sent to the plan management apparatus 410 whenever necessary.

—Functional Blocks of Drone

As illustrated in FIG. 13, the drone 100 includes the flight control section 21 and a drone position detection section 24a.

The flight control section 21 is a functional section that drives the motors 102 and controls a flight, and a takeoff and a landing of the drone 100 in accordance with a flight plan determined by the plan management apparatus 410.

The drone position detection section 24a is a functional section that detects current position coordinates of the drone 100. The current position coordinates of the drone 100 detected by the drone position detection section 24a are sent to the plan management apparatus 410 whenever necessary.

—Functional Block of Plan Management Apparatus 410

The plan management apparatus 410 implements the drone system in coordination with the drone 100 performing a predetermined operation over an agricultural field and the movable body 406a allowing the drone 100 to make a takeoff and a landing. The plan management apparatus 410 determines and manages an operation plan (a flight plan and a movement plan to be described later are collectively referred to as "operation plan") of the drone 100 and the movable body 406a and instructs the drone 100 and the movable body 406a to perform a flight and a movement based on the operation plan.

This plan management apparatus 410 is implemented on, for example, the agriculture cloud 405 and includes, as illustrated in FIG. 13, a plan determining section 41, an instructing section 42, a determination processing section 43, and a plan changing section 44.

Note that operations of inputting data, instructions, and the like to the plan management apparatus 410 are performed with a predetermined terminal that is provided in the operating device 401, the movable body 406a, or the like. The plan management apparatus 410 can be implemented in one terminal or system other than the agriculture cloud 405 in an integrated manner, or in a plurality of terminals or systems other than the agriculture cloud 405 in a distributed manner.

The plan determining section 41 determines a flight plan for the drone 100 and a movement plan for the movable body 406a in accordance with the flight plan.

Figure 14:
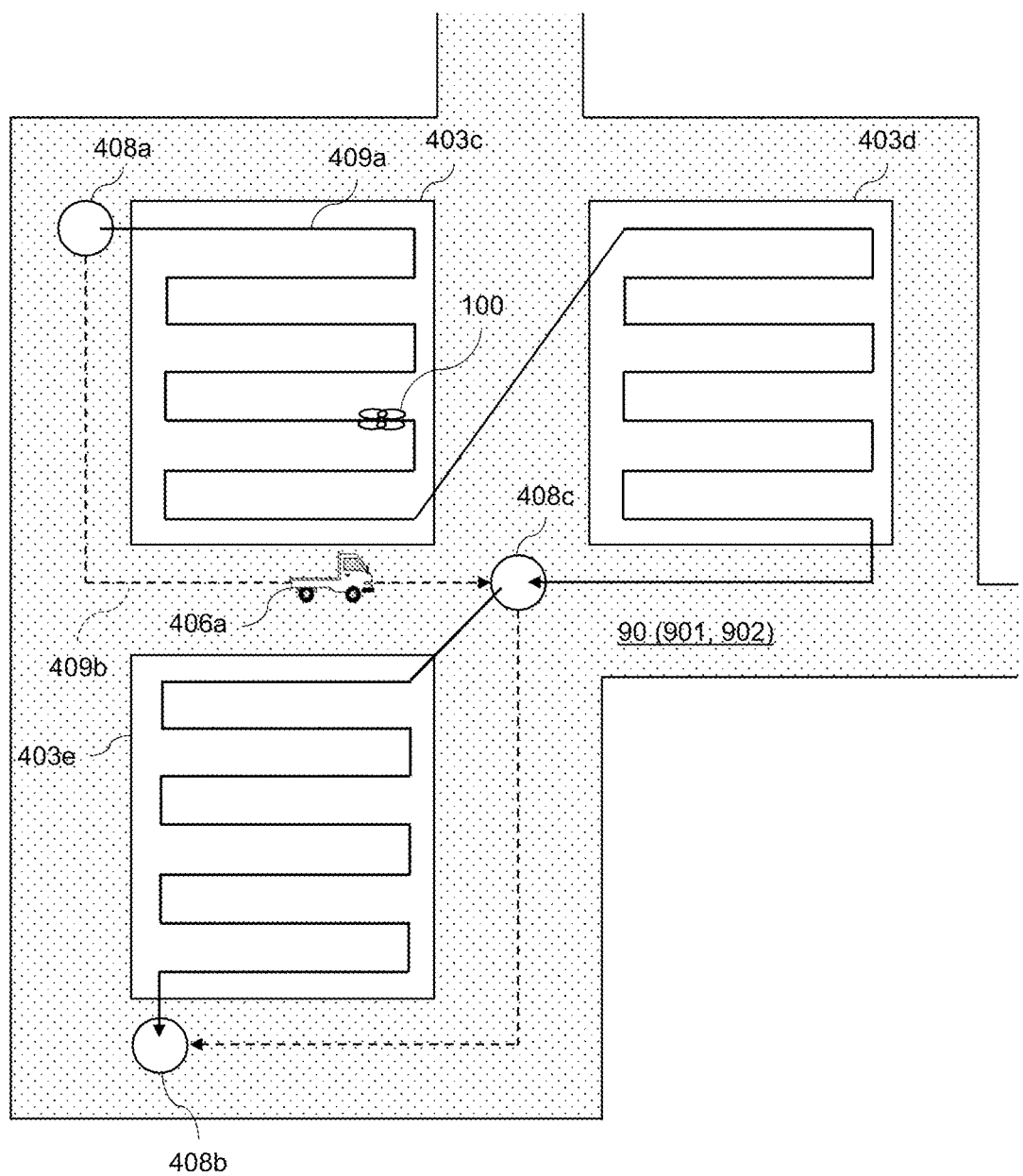
FIG. 14 is a schematic diagram illustrating a flight plan for the drone and a movement plan for the movable body that are determined by a plan management apparatus according to the invention of the present application.

Here, an outline of a flight plan for the drone and a movement plan for the movable body will be described with reference to FIG. 14.

A flight plan for the drone 100 includes information concerning a flight route 409a on which the drone 100 flies to perform an operation such as spreading chemical agent and capturing images of agricultural fields 403c, 403d, and 403e, a takeoff point 408a at which the drone 100 takes off from the movable body 406a, a landing point 408b at which the drone 100 lands on the movable body 406a after completion of the operation, and the like. A movement plan for the movable body 406a includes information concerning the takeoff point 408a at which the drone 100 makes a takeoff, the landing point 408b at which the drone 100 makes a landing, a movement route 409b on which the movable body 406a moves in accordance with a point at which the drone 100 makes a takeoff and a landing, and the like so that the drone 100 takes off from and lands on the takeoff-landing point 406.

The takeoff point 408a is determined to be, for example, a current point of the movable body 406a or the drone 100 at a time when a determination request for the flight plan and the movement plan is received from the user 402, any point set by the user 402, or the like.

The landing point 408b is determined to be, for example, a point that is in a vicinity of an operation-completion scheduled point of the drone 100, within the stoppage permitted area 902 where the movable body 406a can move and the drone 100 can land on the movable body 406a, and closest to the operation-completion scheduled point.

The takeoff point 408a at which the drone 100 takes off from the movable body 406a and the landing point 408b at which the drone 100 lands on the movable body 406a after completion of the operation may be determined to be the same point or points different from each other. For example, in a case where the operation-completion scheduled point of the drone 100 is at a predetermined or longer distance from the takeoff point 408a, the landing point 408b of the drone 100 is determined to be a point different from the takeoff point 408a because causing the movable body 406a to move to the operation-completion scheduled point while the drone 100 is performing an operation makes the operation more effective and conserves battery consumption of the drone 100 more than causing the drone 100 to return to the takeoff point 408a.

<Example of Providing Battery-Oriented Mode and Time-Oriented Mode>

In addition, modes of operation may be roughly provided in advance, and the user 402 may select one of the modes optionally. Examples of the modes include a battery-oriented mode and a time-oriented mode. The battery-oriented mode is a mode in which priority is given to the conservation of battery consumption of the drone 100; the drone 100 is transported by the movable body 406a as far as possible outside the agricultural fields 403c, 403d, and 403e. For example, when an operation in the agricultural field 403c is finished, the drone 100 is caused to land on the movable body 406a at an operation completion point in the agricultural field 403c, and the drone 100 is transported by the movable body 406a to the next agricultural field 403d. In such a mode, the battery consumption of the drone 100 outside the agricultural fields 403c, 403d, and 403e can be conserved, so that the number of times of electric recharging of the drone 100 can be reduced, enabling a long-time use of the drone 100.

The time-oriented mode is a mode for minimizing a time taken by the drone 100 to perform an operation. The drone 100 normally can move faster and more linearly than the movable body 406a; therefore, the time-oriented mode causes the drone 100 to fly to move between the agricultural fields 403c, 403d, and 403e, or the like as far as possible, thereby conserving a time taken for the operation plan.

These modes may be switched therebetween in accordance with conditions or in response to a command from the user 402; in a case where the switching can be made in accordance with conditions, for example, a threshold value is set to a factor that influences the plan, such as a remaining capacity of the battery 502, and the switching is determined based on the threshold value.

<Example in which Operation is Performed on a Plurality of Agricultural Fields>

In a case of a plurality of agricultural fields 403c, 403d, and 403e, the flight plan includes an operation sequence of the agricultural fields 403c, 403d, and 403e in which the drone 100 is to perform an operation, and the operation sequence of the agricultural fields 403c, 403d, and 403e is, for example, determined to be an order from closest to the takeoff point 408a of the drone 100, from the viewpoint of operational efficiency.

<Example in which Relay Point is Set>

In a case where replenishment with chemical agent, electric recharging of the battery, or the like is necessary for the drone 100 in the middle of an operation due to a wide operation area, the flight plan and the movement plan include a relay point 408c at which the drone 100 lands on the takeoff-landing point temporarily. At the relay point 408c, the replenishment with chemical agent, the electric recharging of the battery, or the like is performed on the drone 100.

A plurality of relay points may be provided; a settable plan is a plan in which relay points are provided in a vicinity of an operation completion point of one agricultural field and an operation starting point of an agricultural field where an operation is to be performed subsequent to the one agricultural field, and the drone 100 is transported between the relay points by the movable body 406a. In a case where the drone 100 is transported between the relay points by the movable body 406a in this manner, replenishment with chemical agent, electric recharging of the battery, or the like can be performed on the drone 100 during the transportation.

Note that the flight plan includes instruction information on spreading chemical agent, capturing images, or the like in each of the agricultural fields 403c, 403d, and 403e, information on a flight route of the drone 100 for spreading chemical agent or capturing images all over the agricultural fields 403c, 403d, and 403e, and the like, and the flight route for spreading chemical agent or capturing images all over the agricultural fields 403c, 403d, and 403e is determined in accordance with a predetermined algorithm.

The flight plan and the movement plan can be configured such that some or all of elements of the flight plan and the movement plan such as the takeoff point 408a, the landing point 408b, and the operation sequence of the agricultural fields 403c, 403d, and 403e can be set by the user 402, and only elements that are not set by the user 402 are determined by the plan determining section 41.

Also in the determination of the operation plan in the present embodiment described with reference to FIG. 14, the numbers of drones 100 and movable bodies 406a may be each one or more as described with reference to FIG. 9, and in a case where an operation is performed by pluralities of drones 100 and movable bodies 406a, a flight plan and a movement plan to perform the operation are determined for each drone 100 and each movable body 406a, respectively, to perform the operation in coordination with each other.

As described above, the functional sections of the plan management apparatus 410 can be implemented in an integrated manner or a distributed manner as appropriate, and functions of the plan determining section 41 can be further subdivided, and the subdivided functions can be distributed among the terminals, systems, and the like. For example, the functions of the plan determining section 41 can be divided into a flight plan determining section that determines a flight plan and a movement plan determining section that determines a movement plan, and the drone 100 and the movable body 406a can be made to hold the flight plan determining section and the movement plan determining section, respectively. In a case where the flight plan determining section and the movement plan determining section are separately held by the drone 100 and the movable body 406a, a final authority necessary for coordinating the plans such as determining a series of operation plans and changing any of the plans is to be granted to any one of the drone 100 and the movable body 406a.

The instructing section 42 instructs the drone 100 to execute an operation in accordance with a flight plan. The instructing section 42 instructs the movable body 406a to move or to be on standby in accordance with a movement plan.

During an operation by the drone 100, the determination processing section 43 determines whether to perform electric recharging of the battery 502 or replenishment of chemical agent based on a charge amount of the battery 502 and a remaining amount of chemical agent of the drone 100.

Here, although the flight plan for the drone 100 and the movement plan for the movable body 406a are determined in advance by the plan determining section 41, the plans are set based on the charge amount and the remaining amount of chemical agent in the drone 100, and thus the charge amount of the battery 502 and the remaining amount of the chemical agent need not be taken into consideration during an operation as long as the operation proceeds as estimated. However, consumption of the battery or discharge of the chemical agent may be more than estimated due to disturbance factors in an operation such as interference of wind; therefore, a remaining capacity of the battery 502 and a remaining amount of the chemical agent are monitored during an operation to determine whether to perform the electric recharging or the replenishment, so that a safe, reliable operation can be achieved.

More specifically, during an operation by the drone 100, based on information concerning the charge amount of the battery 502 included in the drone 100 and a current position of the drone 100, the determination processing section 43 determines whether the charge amount is sufficient for the drone 100 to fly from the current position to a landing point, as a first determination process.

In addition, during the operation by the drone 100, based on information concerning the remaining amount of the chemical agent included in the drone 100 and the current position of the drone 100, the determination processing section 43 determines whether the chemical agent is sufficient for the drone 100 to spread over an agricultural field from the current position to the landing point, as a second determination process.

When the charge amount is determined to be insufficient for the drone 100 to fly to the landing point, the plan changing section 44 changes the flight plan and further changes the movement plan when necessary to set a relay point or to change the landing point, so as to allow the drone 100 to have the battery 502 charged and to cut short the operation.

When the remaining amount is determined to be insufficient for the drone 100 to spread the chemical agent over the agricultural field to the landing point, the plan changing section 44 changes the flight plan and further changes the movement plan when necessary to set a relay point or to change the landing point, so as to allow the drone 100 to be replenished with chemical agent and to cut short the operation.

In addition, during an operation by the drone, the plan changing section 44 can receive an interruption by a suspending action to suspend the operation from the user 402 via the operating device 401 or the like. In a case where the suspending action is received from the user 402a, the plan changing section 44 changes the flight plan and/or the movement plan in response to the suspending action and determines a suspension plan for completing the suspension of the operation, and the instructing section 42 instructs the drone 100 and the movable body 406a to execute the suspension plan.

In this regard, in an operation of spreading chemical agent or the like by the drone 100, the user 402 has to determine suspension of the operation due to the user 402's need of taking a break, a change in the weather (particularly precipitation or rain), or the like and to reflect the determination in the system. The suspension plan determined after the suspension of the operation has been received from the user 402 is normally completed when the drone 100 in operation suspends the operation such as spreading chemical agent or the like and lands on the movable body 406a. A pattern of the suspension plan up to its completion is not limited to a specific pattern; for example, in a case where the movable body 406a is moving, a pattern causes the movable body 406a to suspend the movement (may cause the movable body 406a to move to the nearby stoppage permitted area 902 and then suspend the movement) and causes the drone 100 to land on the movable body 406a having suspended the movement. In another example, in a case where the movable body 406a is stopping at a predetermined point, a pattern causes the movable body 406a to be on standby at its current point. The pattern then causes the drone 100 in operation to suspend the operation and causes the drone 100 to land on the movable body 406a being on standby. Alternatively, a pattern can cause the movable body 406a to move to a predetermined point such as a point set by the user 402 and a landing point originally planned and cause the drone 100 in operation to suspend the operation and to land on the movable body 406a caused to move to the predetermined point. Any one of the patterns can be selected optionally by the user 402, or one of the patterns can be selected by default.

—Flowchart

Behaviors of components having features in the embodiment described above will be described.

Figure 15:
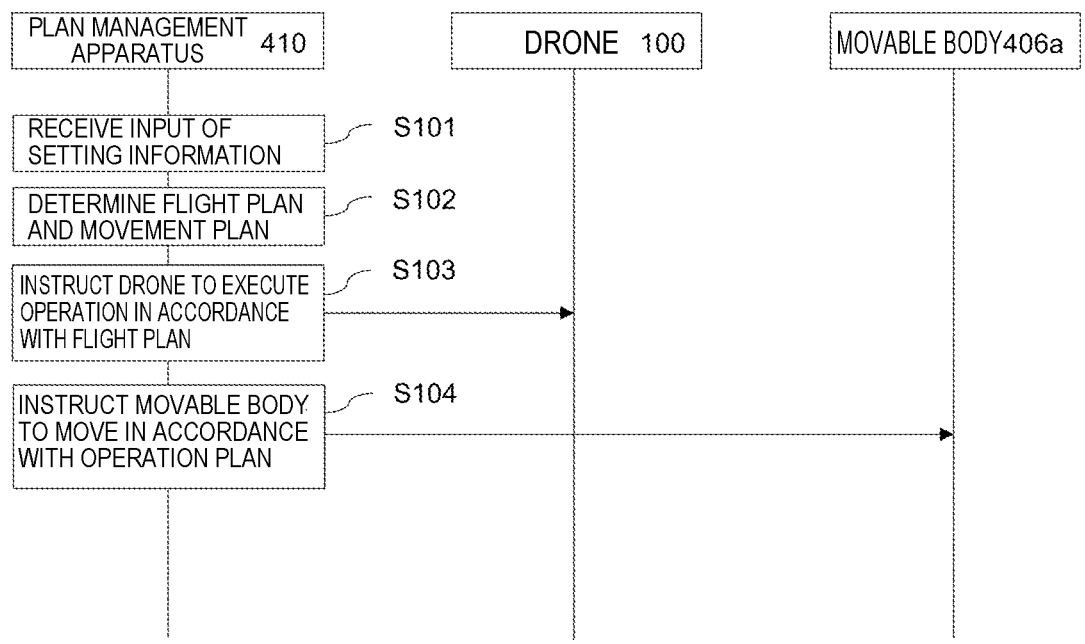
FIG. 15 is a sequence diagram illustrating the entire flow of processing performed by the drone system.

FIG. 15 illustrates a flow of processing from determining a flight plan for the drone 100 and a movement plan for the movable body 406a to starting an operation.

First, as information necessary to determine a plan of the operation by the drone 100 and the movable body 406a, a determination request for an operation plan is received from the user 402 together with information on an agricultural field on which the operation is to be performed, the automated-driving permitted area 90 that surrounds the agricultural field and within which the movable body 406a is to move, and the like (S101). In response to the determination request, the plan determining section 41 determines a flight plan and a movement plan (S102).

The information necessary to determine the operation plan for the drone 100 may be registered in advance in the plan management apparatus 410.

Then, the instructing section 42 gives the drone 100 instructions on execution of the operation based on the flight plan (S103) and gives the movable body 406a instructions on movement based on the movement plan (S104).

This causes the drone 100 and the movable body 406a to perform the operation.

Figure 16:
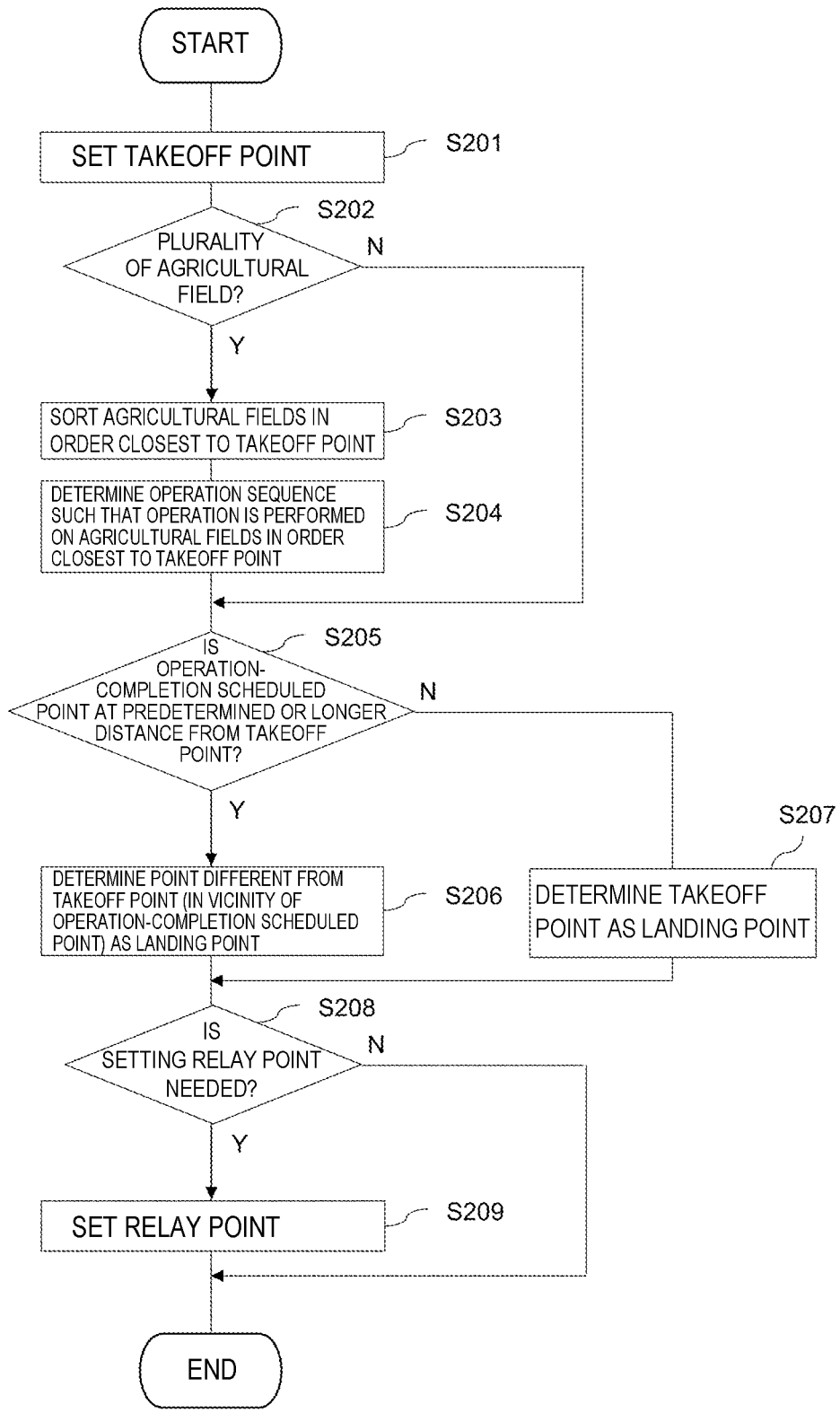
FIG. 16 is a flowchart illustrating a flow of processing in which the plan management apparatus determines an operation plan.

FIG. 16 illustrates a detailed flow of how the plan determining section 41 determines the flight plan for the drone 100 and the movement plan (a process of S102 in FIG. 15 described above).

First, a takeoff point of the drone 100 is set (S201).

The takeoff point is a starting point of the operation; for example, the takeoff point may be determined to be a point specified by the user 402 or may be determined to be a current point of the drone 100.

After setting the takeoff point, in a case where the operation is to be performed on a plurality of agricultural fields (S202), the plan determining section 41 sorts the plurality of agricultural fields in order closest to the takeoff point (S203) and determines an operation sequence such that the operation is performed on the agricultural fields in order closest to the takeoff point (S204).

In a case where the operation-completion scheduled point is at a predetermined or longer distance from the takeoff point of the drone 100 (S205), the plan determining section 41 determines a point different from the takeoff point as the landing point of the drone 100. Specifically, the plan determining section 41 determines a point in the stoppage permitted area 902 closest to the operation-completion scheduled point as the landing point (S206).

In contrast, in a case where the operation-completion scheduled point is within the predetermined distance from the takeoff point of the drone 100, the plan determining section 41 determines the takeoff point as the landing point of the drone 100 (S207).

In a case where it is determined based on the charge amount and the remaining amount of chemical agent in the drone 100 that electric recharging of the battery 502 or replenishment with chemical agent is necessary in the middle of the operation for performing a series of operations (S208), a relay point for performing the electric recharging of the battery 502 or the replenishment with chemical agent is set (S209).

The relay point is set to, for example, a point in the stoppage permitted area 902 close to a position at which the electric recharging of the battery 502 or the replenishment with chemical agent becomes necessary. However, this will not limit how to set the relay point; the plan can be determined such that the drone 100 returns once to the takeoff point in the middle of the operation, and the electric recharging of the battery 502 or the replenishment with chemical agent is performed at the takeoff point.

Elements constituting the flight plan for the drone 100 and the movement plan for the movable body 406a, such as an order of agricultural fields in which an operation is to be performed, are thereby determined together with a takeoff point, a landing point, and a relay point (only when necessary) of the drone 100.

Next, processing performed during an operation by the drone 100 will be described.

Figure 17:
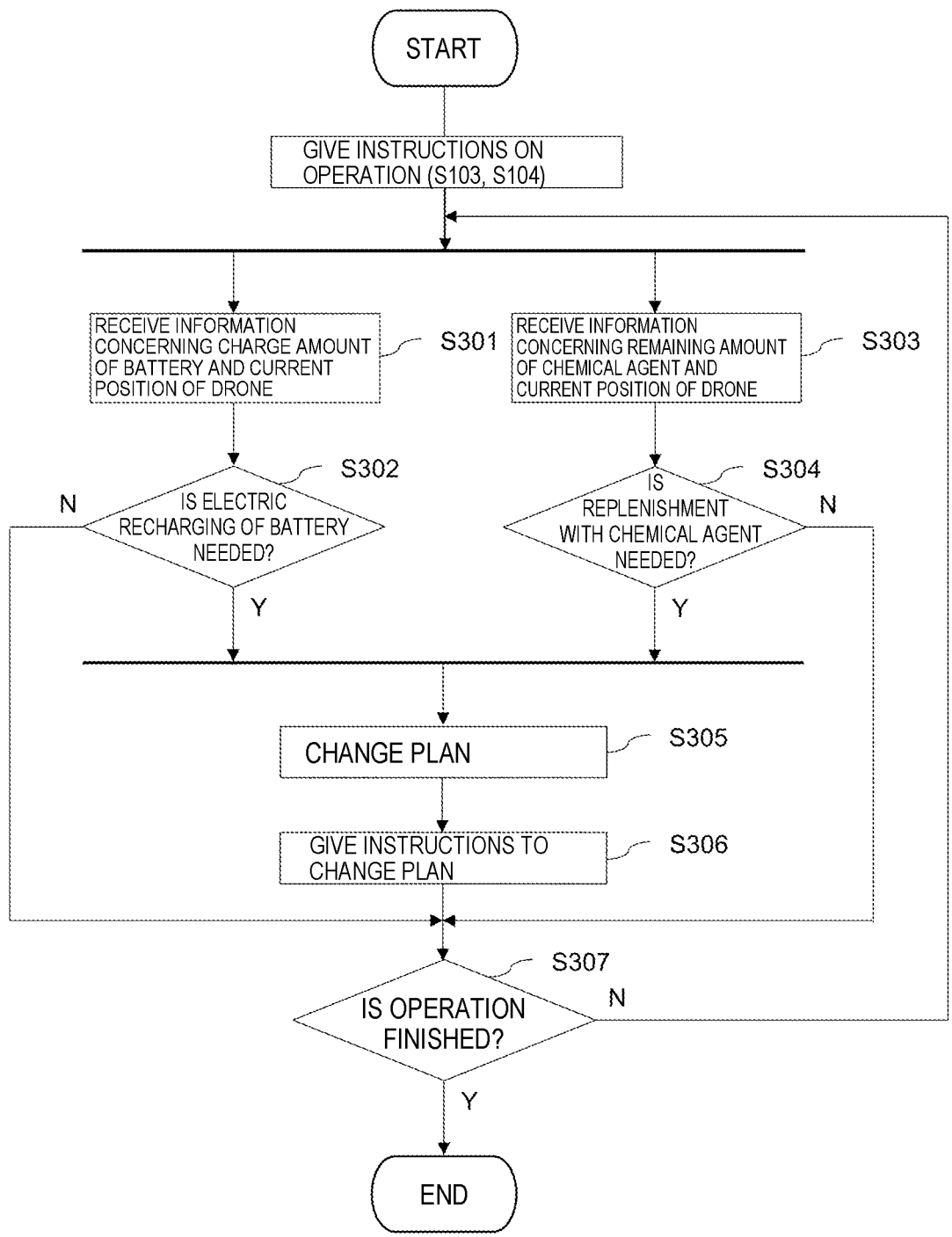
FIG. 17 is a flowchart illustrating a flow of processing performed by the plan management apparatus during an operation.

As illustrated in FIG. 17, in a case where the drone 100 and the movable body 406a are given their respective operations, while the operations are performed, the determination processing section 43 receives, whenever necessary, information concerning a charge amount of the battery 502 included in the drone 100 and a current position of the drone 100 (S301) and determines, based on the information, whether the charge amount is sufficient for the drone 100 to fly from the current position to a landing point or a relay point determined in advance (S302), as the first determination process.

When the determination processing section 43 determines as a result that electric recharging of the battery 502 is necessary, the plan changing section 44 changes the flight plan and the movement plan (S305) to set a new relay point for performing the electric recharging of the battery 502 or to cut short the operation.

The drone 100 and the movable body 406a are instructed on the change of the plans by the instructing section 42 (S306), and the drone 100 and the movable body 406a thereafter perform their operations based on the changed plans.

Concurrently with the first determination process, the determination processing section 43 receives, whenever necessary, information concerning a remaining amount of chemical agent included in the drone 100 and a current position of the drone 100 (S303) and determines, based on the information, whether the chemical agent is sufficient for the drone 100 to spread over an agricultural field from the current position to a landing point or a relay point determined in advance (S304), as the second determination process.

When the determination processing section 43 determines as a result that replenishment with chemical agent is necessary, as in the case where the electric recharging of the battery 502 is determined to be necessary, the plan changing section 44 changes the flight plan and the movement plan (S305), and the instructing section 42 instructs the drone 100 and the movable body 406a on the change of the plans (S306).

The processing described above is performed until the operations are finished (S307), thereby preventing a suspension of the operations or an accident due to insufficiency of the battery 502 or the chemical agent in the middle of the operations.

The embodiment described above is configured such that the operation plan from the takeoff point to the landing point of the drone 100 is determined before the operations are started; however, another example can be configured such that the takeoff point is not determined at the start of the operation, and the landing point is determined at a predetermined timing before the operations are completed.

In this case, the plan determining section 41 does not determine the landing point in the determination of the flight plan for the drone 100 and the movement plan for the movable body 406a but determines the landing point at the predetermined timing before the operations. Specifically, at the predetermined timing before the operations are completed, the plan determining section 41 receives, from the drone 100, an advance notification about completion of the operations being upcoming and determines the landing point of the drone 100 accordingly.

Figure 18:
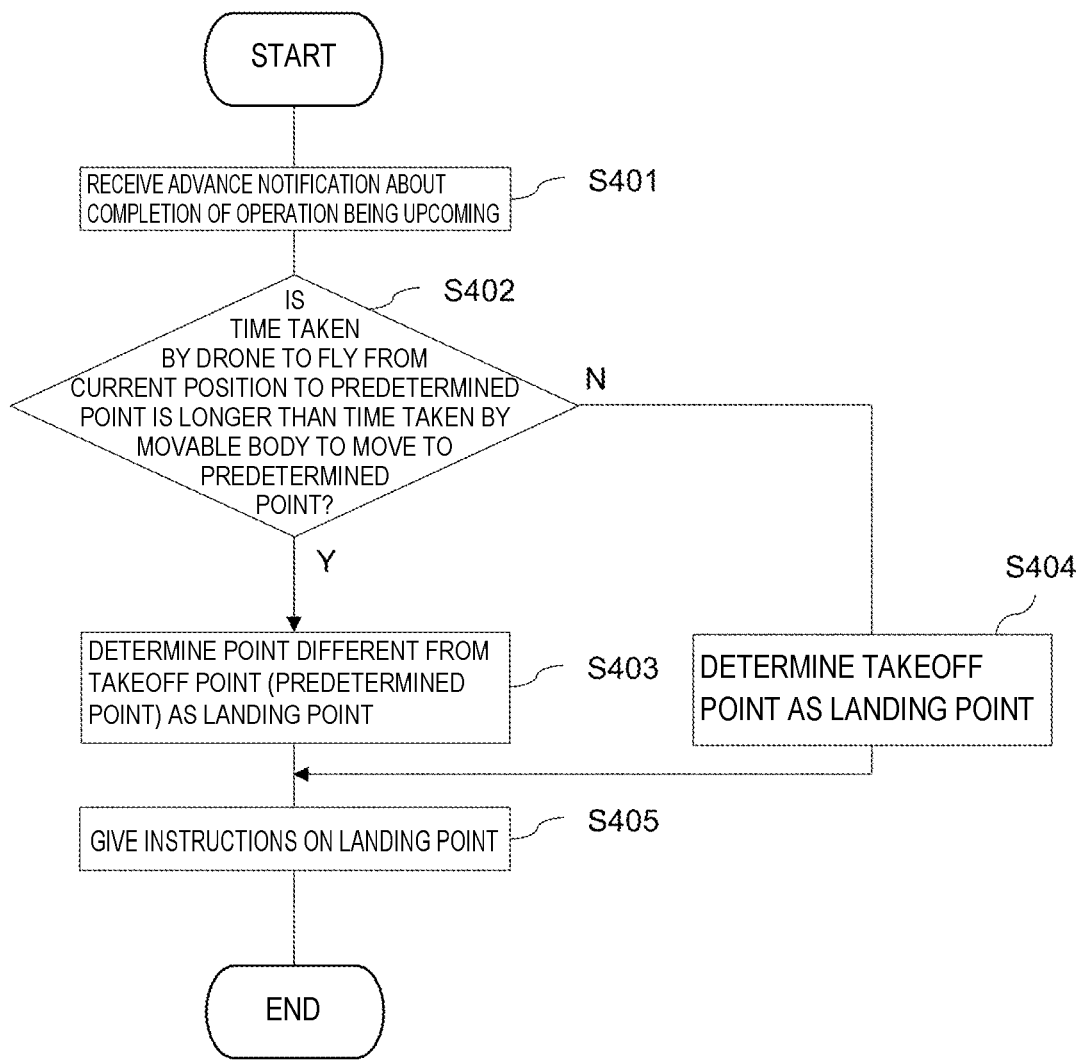
FIG. 18 is a flowchart illustrating an example of processing in which the plan management apparatus determines a landing point of the drone.

A specific flow of processing in this example is illustrated in FIG. 18.

At a predetermined timing before an operation in an agricultural field is completed, for example, 10 minutes before the completion or 200 m to go for the completion, the drone 100 sends an advance notification about completion of the operation being upcoming to the plan management apparatus 410 together with information concerning a current position of the drone 100, and the plan management apparatus 410 receives the advance notification (S201).

In response to the advance notification, the plan determining section 41 determines the landing point of the drone 100.

In an example of a process of determining the landing point, a point in the stoppage permitted area 902 closest to an operation-completion scheduled point from the current position of the drone 100 is determined as a predetermined point based on a first necessary time necessary for the drone 100 to fly to the predetermined point and a second necessary time necessary for the movable body 406a to move from its current position (takeoff point) to the predetermined point (S402). That is, in a case where the first necessary time is longer than the second necessary time, the predetermined point is determined as the landing point (S403). In contrast, in a case where the second necessary time is longer than the first necessary time, the current position (takeoff point) is determined as the landing point (S404).

Upon the determination of the landing point, the instructing section 42 instructs the drone 100 and the movable body 406a on the landing point (S405), the drone 100 flies, the movable body 406a moves or is on standby in accordance with the instructions, and the drone 100 lands on the landing point.

Note that the determination of the landing point of the drone 100 can be performed as in the example of determining the flight plan and the movement plan in advance. In this example, in a case where the operation-completion scheduled point is at a predetermined or longer distance from the takeoff point of the drone 100, the landing point of the drone 100 is determined to be a point different from the takeoff point such as a point in the stoppage permitted area 902 closest to the operation-completion scheduled point. In contrast, in a case where the operation-completion scheduled point is within the predetermined distance from the takeoff point of the drone 100, the takeoff point is determined to be the landing point of the drone 100.

This example does not limit how to determine the landing point; for example, a point in the stoppage permitted area 902 closest to the current position of the drone 100 can be determined as the landing point.

The drone system according to the present embodiment described above makes it possible, in a system including a drone that executes a predetermined operation by automatic flight and a movable body that transports the drone, to determine an operation plan for the drone and the movable body automatically. Moreover, the drone system makes it possible to create an efficient operation plan and to change the operation plan in accordance with circumstances of the operation, improving an operational efficiency of the drone.

Although the present embodiment described above is configured such that, in a case of a plurality of agricultural fields, the operation plan including the flight plan for the drone 100 and the movement plan for the movable body 406*a* is collectively determined for performing the operation, an operation plan may be determined for each agricultural field for performing the operation. That is, for the plurality of agricultural fields, every time an operation in one agricultural field is finished, an operation plan for the next agricultural field is determined.

Figure 19:
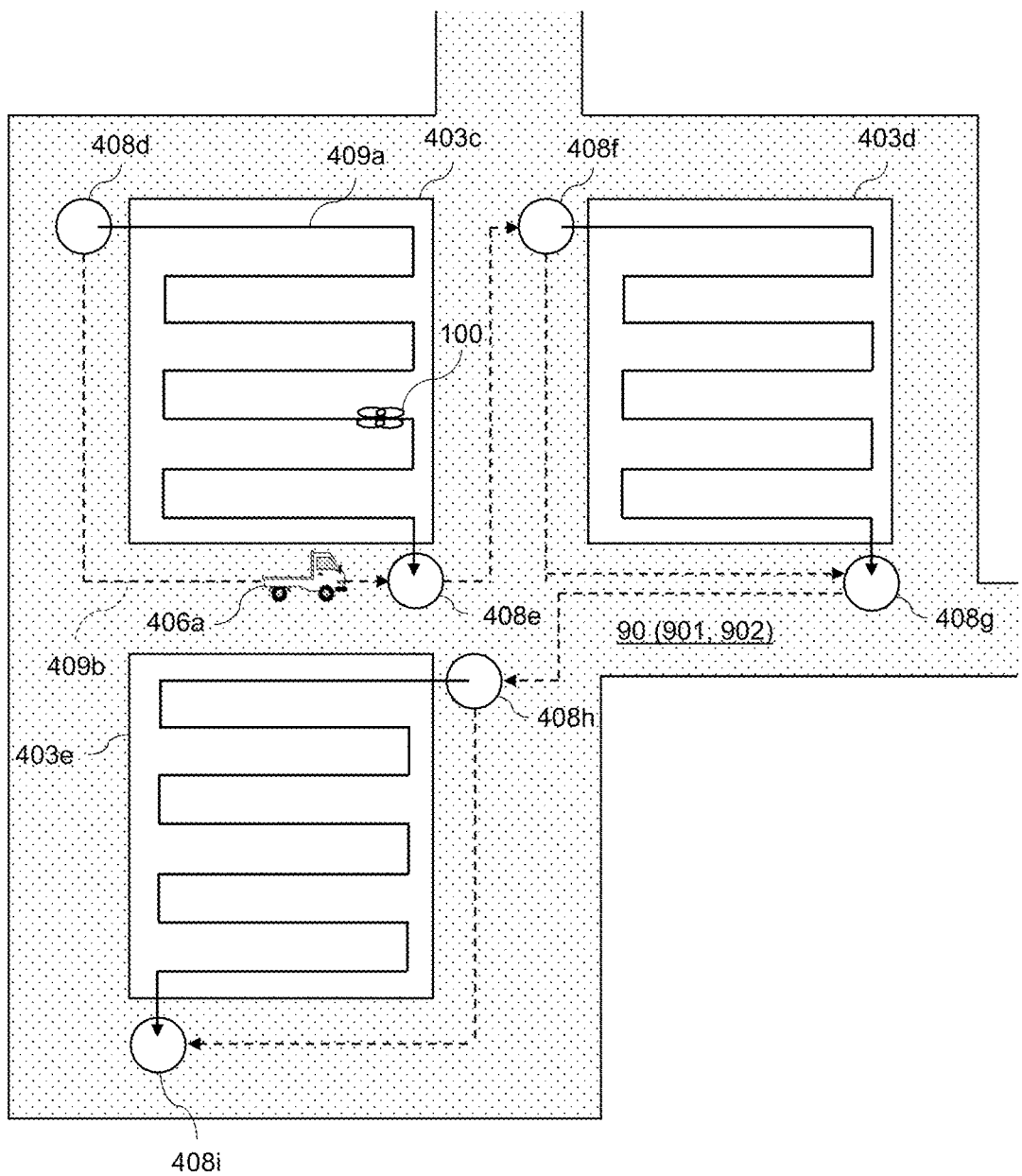
FIG. 19 is a schematic diagram illustrating another example of a flight plan for the drone and a movement plan for the movable body that are determined by the plan management apparatus according to the invention of the present application.

For example, as illustrated in FIG. 19, in a case where an operation is performed on the agricultural fields 403*c*, 403*d*, and 403*e*, a flight plan for the drone 100 and a movement plan for the movable body 406*a* are first determined for the agricultural field 403*c*. Here, assume that a takeoff point 408*d* and a landing point 408*e* are determined for an operation in the agricultural field 403*c*, the operation in the agricultural field 403*c* is completed when the drone 100 lands on the movable body 406*a* that has moved to the landing point 408*e*.

Then, in accordance with instructions or the like by the user 402, the movable body 406*a* transports the drone 100 to the agricultural field 403*d* in which the next operation is to be performed. When the movable body 406*a* and the drone 100 move to the agricultural field 403*d*, an operation plan including a flight plan for the drone 100 and a movement plan for the movable body 406*a* in the agricultural field 403*d* is determined anew. This operation plan includes, for example, a takeoff point 408*f* and a landing point 408*g*, and an operation to be performed between the points.

When the operation in the agricultural field 403*d* is completed, similarly, in accordance with instructions or the like by the user 402, the movable body 406*a* transports the drone 100 to the agricultural field 403*e* in which the next operation is to be performed. When the movable body 406*a* and the drone 100 move to the agricultural field 403*e*, an operation plan including a flight plan for the drone 100 and a movement plan for the movable body 406*a* in the agricultural field 403*e* is determined anew. This operation plan includes, for example, a takeoff point 408*h* and a landing point 408*i*, and an operation to be performed between the points. Then, with landing of the drone 100 having finished the operation on the landing point 408*i*, the series of operations is finished.

Note that various functions and processes in the above description can be combined into configurations to appropriate designs.

Although the present description has been made about a drone for spreading an agricultural chemical agent as an example, a technical concept of the present invention is not limited to this example and is applicable generally to drones for other uses such as photographing and monitoring. In particular, the technical concept is applicable to machinery that operates autonomously. Furthermore, the movable body is not limited to a vehicle and may have any appropriate configuration.

Technically Advantageous Effects of the Invention of the Present Application

The drone system according to the present invention enables operational coordination between a drone and a movable body that is capable of moving with the drone aboard and allows the drone to make a takeoff and a landing, so as to maintain a high safety even in a case where the drone performs an autonomous flight.

The invention claimed is:

1. A drone system in which a drone and a movable body operate in coordination with each other, the drone performing a predetermined operation in a predetermined area, the movable body being capable of moving with the drone aboard and allowing the drone to make a takeoff and a landing, the drone system comprising:
 a plan determining section that determines a flight plan for the drone and a movement plan for the movable body in accordance with the flight plan;
 a first instructing section that instructs the drone to execute an operation in accordance with the flight plan; and
 a second instructing section that instructs the movable body to move or to be on standby in accordance with the movement plan, wherein
 the flight plan and the movement plan include a takeoff point at which the drone takes off from the movable body and a landing point at which the drone lands on the movable body after completion of an operation, and
 the landing point is determined to be a point that is in a vicinity of an operation-completion scheduled point of the drone, and the movable body is allowed to move to the point, and is closest to the operation-completion scheduled point.

2. The drone system according to claim 1, wherein in a case of a plurality of predetermined areas, the flight plan includes an operation sequence of the predetermined areas in which the drone is to perform an operation.

3. The drone system according to claim 2, wherein the operation sequence of the predetermined areas is determined to be in order closest to a takeoff point at which the drone takes off from the movable body.

4. The drone system according to claim 1, wherein in a case where a scheduled point at completion of an operation by the drone is at a predetermined or longer distance from the takeoff point, the plan determining section determines a point different from the takeoff point as the landing point of the drone.

5. The drone system according to claim 1, further comprising:
 a first determination processing section that determines, during an operation by the drone, based on information concerning a charge amount of a battery included in the drone and a current position of the drone, whether the charge amount is sufficient for the drone to fly from the current position to the landing point; and
 a first plan changing section that changes, when the charge amount is determined to be insufficient for the drone to fly to the landing point, the flight plan and/or the movement plan.

6. The drone system according to claim 5, wherein the first plan changing section sets a relay point in the flight plan and/or the movement plan.

7. The drone system according to claim 5, wherein the first plan changing section changes the landing point in the flight plan and/or the movement plan.

8. The drone system according to claim 1, further comprising:
an advance notification receiving section that receives, at a predetermined timing before an operation is completed, an advance notification about completion of the operation being upcoming, from the drone, wherein
in response to reception of the advance notification, the plan determining section determines the landing point of the drone.

9. The drone system according to claim 8, wherein based on a first necessary time necessary for the drone to fly from a current position of the drone to a predetermined point and a second necessary time necessary for the movable body to move from a current position of the movable body to the predetermined point, the predetermined point being a point that is in a vicinity of an operation-completion scheduled point and to which the movable body can move, in a case where the first necessary time is longer than the second necessary time, the predetermined point is determined as the landing point.

10. The drone system according to claim 1, further comprising a suspending action receiving section that receives, during an operation by the drone, a suspending action to suspend the operation.

11. The drone system according to claim 10, further comprising a third plan changing section that changes the flight plan and/or the movement plan in response to the suspending action.

12. The drone system according to claim 1, further comprising a third instructing section that instructs, during an operation by the drone, in a case where a user of the drone takes a suspending action to suspend the operation with an operating device, the drone and the movable body to execute a suspension plan that is determined in response to the suspending action.

13. The drone system according to claim 12, wherein the suspension plan includes a plan that causes the drone being performing an operation to suspend the operation, causes the movable body being moving to suspend the movement, and causes the drone to land on the movable body suspending the movement.

14. The drone system according to claim 12, wherein the suspension plan includes a plan that causes the drone being performing an operation to suspend the operation, causes, in a case where the movable body is stopping at a predetermined point, the movable body to be on standby at the predetermined point, and causes the drone to land on the movable body being on standby.

15. The drone system according to claim 12, wherein the suspension plan includes a plan that causes the drone being performing an operation to suspend the operation, causes the movable body to move to a predetermined point, and causes the drone to land on the movable body at the predetermined point.

16. A drone system in which a drone and a movable body operate in coordination with each other, the drone performing a predetermined operation in a predetermined area, the movable body allowing the drone to make a takeoff and a landing, the drone system comprising:
a plan determining section that determines a flight plan for the drone and a movement plan for the movable body in accordance with the flight plan;
a first instructing section that instructs the drone to execute an operation in accordance with the flight plan; and
a second instructing section that instructs the movable body to move or to be on standby in accordance with the movement plan, wherein
the flight plan and the movement plan include a takeoff point at which the drone takes off from the movable body and a landing point at which the drone lands on the movable body after completion of an operation, and
in a case where a time taken by the drone to fly from an operation-completion scheduled point to the takeoff point is equal to or longer than a predetermined time, the plan determining section determines a point different from the takeoff point as the landing point of the drone.

17. A drone system in which a drone and a movable body operate in coordination with each other, the drone performing a predetermined operation in a predetermined area, the movable body allowing the drone to make a takeoff and a landing, the drone system comprising:
a plan determining section that determines a flight plan for the drone and a movement plan for the movable body in accordance with the flight plan;
a first instructing section that instructs the drone to execute an operation in accordance with the flight plan; and
a second instructing section that instructs the movable body to move or to be on standby in accordance with the movement plan, wherein
the flight plan and the movement plan include a takeoff point at which the drone takes off from the movable body and a landing point at which the drone lands on the movable body after completion of an operation, and
the drone system further comprising:
a second determination processing section that determines, during an operation by the drone, based on information concerning a remaining amount of liquid or powder to be spread included in the drone and a current position of the drone, whether the remaining amount is sufficient for the drone to spread the liquid or the powder to be spread over the predetermined area from the current position to the landing point; and
a second plan changing section that changes, when the remaining amount is determined to be insufficient to spread the liquid or powder to be spread over the predetermined area to the landing point, the flight plan and/or the movement plan.

18. The drone system according to claim 17, wherein the second plan changing section sets a relay point in the flight plan and/or the movement plan.

19. The drone system according to claim 17, wherein the second plan changing section changes the landing point in the flight plan and/or the movement plan.

\* \* \* \* \*